US010469553B2

(12) United States Patent
Wogsberg et al.

(10) Patent No.: US 10,469,553 B2
(45) Date of Patent: *Nov. 5, 2019

(54) INTERCONNECTION MECHANISM FOR MULTIPLE DATA STREAMS

(71) Applicant: Jupiter Systems, LLC, Hayward, CA (US)

(72) Inventors: Eric Wogsberg, Hayward, CA (US); Jack Klingelhofer, Oakland, CA (US); Herbert A. Kutscha, Los Gatos, CA (US)

(73) Assignee: Jupiter Systems, LLC, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,484

(22) Filed: Dec. 21, 2016

(65) Prior Publication Data
US 2017/0237795 A1 Aug. 17, 2017

Related U.S. Application Data

(63) Continuation of application No. 14/102,232, filed on Dec. 10, 2013, now Pat. No. 9,549,011, which is a (Continued)

(51) Int. Cl.
*H04L 29/06* (2006.01)
*H04N 7/18* (2006.01)
(Continued)

(52) U.S. Cl.
CPC .......... *H04L 65/607* (2013.01); *H04L 65/60* (2013.01); *H04N 7/181* (2013.01);
(Continued)

(58) Field of Classification Search
CPC ............... H04N 7/181; H04N 21/2343; H04N 21/2365; H04N 21/4122; H04N 21/4312;
(Continued)

(56) References Cited

U.S. PATENT DOCUMENTS 5,493,568 A 2/1996 Sampat et al.
5,864,554 A 1/1999 Rostoker et al.
(Continued)

FOREIGN PATENT DOCUMENTS

EP 0889452 A2 1/1999
EP 1343315 A1 9/2003
(Continued)

OTHER PUBLICATIONS

Tan, S. et al., "Extended Abstract: Multimedia Network Subsystem Design," Proceedings of the 6th International Workshop on Network and Operating Systems Support for Digital Audio and Video (NOSSDAV '96), Apr. 24, 1996, Zushi, Japan, 5 pages.
(Continued)

*Primary Examiner* — Tonia L Dollinger
*Assistant Examiner* — Steven C Nguyen
(74) *Attorney, Agent, or Firm* — McCoy Russell LLP

(57) ABSTRACT

An audiovisual signal is converted from a native format to a digital, packetized interchange format and transported between a capture node and a display node through a switch. The display node converts the audiovisual signal from the interchange format to a displayable format and causes display of the audiovisual signal. The use of a switch for video routing and distribution allows one-to-one, one-to-many, many-to-one, and many-to-many distribution. The use of a device-independent interchange format allows concurrent distribution of multiple heterogeneous audiovisual signals.

18 Claims, 16 Drawing Sheets

Related U.S. Application Data continuation of application No. 11/419,179, filed on May 18, 2006, now Pat. No. 8,606,949, which is a continuation-in-part of application No. 11/111,182, filed on Apr. 20, 2005, now Pat. No. 8,553,716.

(51) Int. Cl.

| | | |
|---|---|---|
| *H04N 21/2343* | (2011.01) | |
| *H04N 21/2365* | (2011.01) | |
| *H04N 21/41* | (2011.01) | |
| *H04N 21/431* | (2011.01) | |
| *H04N 21/434* | (2011.01) | |
| *H04N 21/436* | (2011.01) | |
| *H04N 21/485* | (2011.01) | |
| *H04N 21/6332* | (2011.01) | |
| *H04N 21/6377* | (2011.01) | |
| *H04N 21/654* | (2011.01) | |
| *H04N 21/658* | (2011.01) | |

(52) U.S. Cl.
CPC ..... *H04N 21/2343* (2013.01); *H04N 21/2365* (2013.01); *H04N 21/4122* (2013.01); *H04N 21/4312* (2013.01); *H04N 21/4314* (2013.01); *H04N 21/4347* (2013.01); *H04N 21/43615* (2013.01); *H04N 21/4858* (2013.01); *H04N 21/6332* (2013.01); *H04N 21/6377* (2013.01); *H04N 21/654* (2013.01); *H04N 21/658* (2013.01)

(58) Field of Classification Search
CPC ........... H04N 21/4314; H04N 21/4347; H04N 21/43615; H04N 21/4858; H04N 21/6332; H04N 21/6377; H04N 21/654; H04N 21/658; H04L 65/607; H04L 65/60
See application file for complete search history.

(56) References Cited

U.S. PATENT DOCUMENTS

| | | | |
|---|---|---|---|
| 6,088,360 | A | 7/2000 | Amaral et al. |
| 6,091,777 | A | 7/2000 | Guetz et al. |
| 6,104,414 | A | 8/2000 | Odryna et al. |
| 6,104,700 | A | 8/2000 | Haddock et al. |
| 6,112,250 | A | 8/2000 | Appelman |
| 6,169,879 | B1 | 1/2001 | Perlman |
| 6,172,605 | B1 | 1/2001 | Matsumoto et al. |
| RE37,057 | E | 2/2001 | Lee |
| 6,233,389 | B1 | 5/2001 | Barton et al. |
| 6,269,099 | B1 | 7/2001 | Borella et al. |
| 6,281,942 | B1 | 8/2001 | Wang |
| 6,333,750 | B1 | 12/2001 | Odryna et al. |
| 6,384,870 | B1 | 5/2002 | Kempisty |
| 6,388,700 | B1 | 5/2002 | Beyers et al. |
| 6,413,217 | B1 | 7/2002 | Mo |
| 6,615,212 | B1 * | 9/2003 | Dutta et al. ............... 707/10 |
| 6,792,048 | B1 | 9/2004 | Lee et al. |
| 6,796,555 | B1 | 9/2004 | Blahut |
| 6,845,398 | B1 | 1/2005 | Galensky et al. |
| 6,859,845 | B2 | 2/2005 | Mate |
| 6,873,368 | B1 | 3/2005 | Yu et al. |
| 6,874,042 | B2 | 3/2005 | Sauber |
| 6,986,158 | B1 | 1/2006 | Terui et al. |
| 6,986,185 | B2 | 1/2006 | Sugarman et al. |
| 7,075,567 | B2 | 7/2006 | Hunter et al. |
| 7,130,935 | B2 | 10/2006 | Sauber |
| 7,131,135 | B1 | 10/2006 | Virag et al. |
| 7,209,488 | B2 | 4/2007 | Becker et al. |
| 7,262,746 | B2 | 8/2007 | Lagarrigue et al. |
| 8,547,997 | B2 | 10/2013 | Wogsberg |
| 8,553,716 | B2 | 10/2013 | Wogsberg |
| 9,549,011 | B2 | 1/2017 | Wogsberg et al. |
| 2001/0008535 | A1 | 7/2001 | Lanigan |
| 2001/0030785 | A1 * | 10/2001 | Pangrac ............... H04N 7/22 398/72 |
| 2002/0010866 | A1 | 1/2002 | McCullough et al. |
| 2002/0011032 | A1 | 1/2002 | Choi |
| 2002/0070960 | A1 | 6/2002 | Maine et al. |
| 2002/0095681 | A1 | 7/2002 | Lin et al. |
| 2002/0116539 | A1 | 8/2002 | Bryczkowski et al. |
| 2002/0168934 | A1 | 11/2002 | Finet |
| 2002/0194596 | A1 | 12/2002 | Srivastava |
| 2003/0025800 | A1 | 2/2003 | Hunter et al. |
| 2003/0078045 | A1 | 4/2003 | Norstrom et al. |
| 2003/0128301 | A1 | 7/2003 | Tarr et al. |
| 2003/0133448 | A1 | 7/2003 | Frink et al. |
| 2003/0135631 | A1 | 7/2003 | Li et al. |
| 2003/0149993 | A1 | 8/2003 | Son et al. |
| 2003/0152032 | A1 | 8/2003 | Yanagihara et al. |
| 2003/0156649 | A1 | 8/2003 | Abrams, Jr. |
| 2003/0210209 | A1 * | 11/2003 | Lagarrigue .......... H04N 7/0806 345/1.3 |
| 2003/0236906 | A1 | 12/2003 | Klemets et al. |
| 2004/0070688 | A1 | 4/2004 | Bazarsky et al. |
| 2004/0114036 | A1 | 6/2004 | Karaoguz et al. |
| 2004/0128402 | A1 | 7/2004 | Weaver et al. |
| 2004/0139233 | A1 * | 7/2004 | Kellerman ........ H04L 29/08756 709/246 |
| 2004/0150751 | A1 | 8/2004 | Phillips et al. |
| 2004/0153951 | A1 * | 8/2004 | Walker et al. ............... 714/776 |
| 2004/0158662 | A1 | 8/2004 | Konda et al. |
| 2004/0172478 | A1 * | 9/2004 | Jacobs ............. H04N 21/23432 709/233 |
| 2004/0179605 | A1 * | 9/2004 | Lane ................ H04N 21/23436 375/240.18 |
| 2004/0181617 | A1 | 9/2004 | Sauber |
| 2004/0233181 | A1 | 11/2004 | Kobayashi |
| 2004/0243540 | A1 | 12/2004 | Moskowitz et al. |
| 2004/0250276 | A1 | 12/2004 | Cana et al. |
| 2004/0255063 | A1 | 12/2004 | Crinon et al. |
| 2004/0257434 | A1 | 12/2004 | Davis et al. |
| 2004/0260827 | A1 | 12/2004 | Wang |
| 2005/0013309 | A1 | 1/2005 | Ravishankar et al. |
| 2005/0144284 | A1 | 6/2005 | Ludwig et al. |
| 2005/0165992 | A1 | 7/2005 | Sauber |
| 2005/0174482 | A1 * | 8/2005 | Yamada et al. ............... 348/383 |
| 2005/0188407 | A1 | 8/2005 | van Beek et al. |
| 2005/0195823 | A1 * | 9/2005 | Chen ................ H04L 12/185 370/395.1 |
| 2005/0239444 | A1 | 10/2005 | Shich |
| 2005/0258983 | A1 | 11/2005 | Jabri et al. |
| 2005/0278462 | A1 | 12/2005 | Gillespie |
| 2006/0002681 | A1 | 1/2006 | Spilo et al. |
| 2006/0056523 | A1 | 3/2006 | Guillotel et al. |
| 2006/0092279 | A1 | 5/2006 | Thompson et al. |
| 2006/0126713 | A1 | 6/2006 | Chou et al. |
| 2006/0161948 | A1 * | 7/2006 | Hwa ............................. 725/37 |
| 2006/0242669 | A1 | 10/2006 | Wogsberg |
| 2007/0033289 | A1 | 2/2007 | Nuyttens et al. |
| 2007/0186002 | A1 * | 8/2007 | Campbell ............. H04N 7/142 709/231 |

FOREIGN PATENT DOCUMENTS

| | | |
|---|---|---|
| EP | 1376299 A2 | 1/2004 |
| EP | 1768383 A1 | 3/2007 |
| WO | 02063416 A2 | 8/2002 |
| WO | 02097584 A2 | 12/2002 |
| WO | 2004056124 A1 | 7/2004 |
| WO | 2004109467 A2 | 12/2004 |
| WO | 2006113776 A2 | 10/2006 |

OTHER PUBLICATIONS

McGowan, J., "John McGowan's AVI Overview: Audio and Video Codecs," Personal Website, Available Online at http://jmcgowan.com/avicodecs.html, Available as Early as Jan. 1, 2000, 28 pages.
"D-Link DSM-320 Wireless Media Player Manual," Media Lounge Entertainment Network Product Manual, Version 1.2 Available as Early as Jan. 1, 2002, 80 pages.

(56) References Cited

OTHER PUBLICATIONS

"ChannePlus S-Video Distribution Module: Model SVD-8 Manual," Linear Corporation Product Manual, Available Online at http://manuals.solidsignal.com/SVD-8.pdf, Available as Early as Jan. 1, 2003, 4 pages.

"Gigabit Ethernet Video Routers to Make All Digital Cable TV a Reality," In-StatMDR Market Alerts Website, Available Online at http://web.archive.org/web/20050218133437/www.instat.com/newmk.asp?ID=681, Jun. 30, 2003, 2 pages.

Walker, M. et al., "Mobile video-streaming," BT Technology Journal, vol. 21, No. 3, Jul. 2003, 11 pages.

Gharai, L. et al., "RTP Payload Format for Uncompressed Video," Internet Engineering Task Force Memo, Available Online at https://tools.ietf.org/html/draft-ietf-avt-uncomp-video-06, Feb. 16, 2004, 19 pages.

"AlterPath KVM: Enterprise KVM Solutions," Cyclades Corporation Datasheet, Available Online at http://wdminc.com/images/alterpath_kvm.en.pdf, Jun. 14, 2004, 2 pages.

"Multi-Room S-Video Cat.5 Distribution System: Distribute Video Over Existing Cat. 5 to Every Room in the House," Smarthome Website, Available Online at http://web.archive.org/web/20040805201146/www.smarthome.com/7699.html, Available as Early as Aug. 5, 2004, 4 pages.

"VESA and Industry Standards and Guidelines for Computer Display Monitor Timing (DMT)," Video Electronics Standards Association Document, Version 1.0, Revision 10, Available Online at http://read.pudn.com/downloads122/ebook/519465/VESA%20Monitor%20Timing%20Standard.pdf, Oct. 29, 2004, 62 pages.

ISA European Patent Office, International Search Report Issued in Application No. PCT/US2006/014684, Jul. 10, 2007, WIPO, 3 pages.

ISA European Patent Office, Written Opinion of the International Searching Authority Issued in Application No. PCT/US2006/014684, dated Jul. 10, 2007, WIPO, 17 pages.

International Bureau of WIPO, International Preliminary Report on Patentability Issued in Application No. PCT/US2006/014684, dated Oct. 23, 2007, WIPO, 18 pages.

European Patent Office, Office Action Issued in Application No. 06750674.1, dated Mar. 17, 2008, Netherlands, 4 pages.

ISA European Patent Office, International Search Report Issued in Application No. PCT/US2007/069316, dated Apr. 3, 2009, WIPO, 3 pages.

ISA European Patent Office, Written Opinion of the International Searching Authority Issued in Application No. PCT/US2007/069316, dated Apr. 3, 2009, WIPO, 6 pages.

International Bureau of WIPO, International Preliminary Report on Patentability Issued in Application No. PCT/US2007/069316, dated Apr. 15, 2009, WIPO, 7 pages.

"Global-Link from Logical Solutions: Secure, Loss-less KVM System for IP," Logical Solutions, Inc. Presentation, Available as Early as Sep. 25, 2009, 17 pages.

"Video Processors: HD Leeza KD-HD1030P," Excerpt from Key Digital Catalog, Available Online at https://content.abt.com/documents/6781/KD-hd1080p_cat_page.pdf, Available as Early as Sep. 25, 2009, 2 pages.

"Instruction Manual HLM4365W/HLM5065W/HLM437W/HLM507W/HLM617W," Samsung Electronics of America, Inc. Product Manual, Available as Early as Sep. 25, 2009, 46 pages.

"Video Converter Comparison Chart," TVOne Specifications Sheet, Available Online at http://assets.techedu.com/assets/1/26/SpecSheet-ConverterCompChart.pdf, Available as Early as Sep. 25, 2009, 1 page.

European Patent Office, Office Action Issued in Application No. 07811908.8, dated Dec. 10, 2009, Germany, 5 pages.

"Universal Video Scalers: Models C2-770, C2-775," TVOne Datasheet, Available as Early as Sep. 25, 2009, 3 pages.

European Patent Office, Office Action Issued in Application No. 06750674.1, dated Apr. 7, 2010, Netherlands, 6 pages.

State Intellectual Property Office of the People's Republic of China, Unofficial English Translation of First Office Action Issued in Application No. 200780026910.5, dated Jan. 31, 2012, 11 pages.

\* cited by examiner

INTERCONNECTION MECHANISM FOR MULTIPLE DATA STREAMS

RELATED CASES

This application is a continuation of U.S. patent application Ser. No. 11/419,179 filed May 18, 2006 by Eric Wogsberg and entitled "Interconnection Mechanism for Multiple Data Streams, which issues as U.S. Pat. No. 8,606,949 on Dec. 10, 2013, which is a continuation-in-part of U.S. patent application Ser. No. 11/111,182 filed Apr. 15, 2005 by Eric Wogsberg and entitled "Audiovisual Signal Routing and Distribution System", which issued as U.S. Pat. No. 8,553, 716 on Oct. 8, 2013, which are incorporated herein by reference in their entirety.

FIELD OF THE INVENTION

This invention relates to the field of audiovisual display systems, and more specifically to efficient movement of multiple audio and/or video data streams from multiple sources to multiple destinations.

BACKGROUND

Ever increasing demand for more content displayed in a single display has led to an increase in production and sales of display walls. Display walls generally include multiple display monitors positioned next to one another in a tiled fashion to present a single large image. Using relatively large flat-panel display monitors and/or rear-projection monitors and tiling them in grid sizes of two-by-two, three-by-three, and three-by-four, among others, an integrated displayed image can occupy an entire wall of a room. Display walls are frequently used in large system command and control centers such as war rooms, utility management centers, and traffic monitoring centers.

Frequently, the content displayed in a display wall includes motion video from multiple sources such as highway-mounted traffic monitoring cameras. For flexibility in viewing these multiple video sources, it is desirable to see each one in a "window," which can be made any size (regardless of the native resolution of the source) and can be positioned at any location within the display wall regardless of the boundaries of the individual constituent display devices. Windows are known and conventional elements of a graphical display and are not described further herein. The transfer of high data-rate digital video streams from multiple sources is the multiple displays of a tiled display wall represents a particularly difficult problem. Since the tiled display monitors represent an integrated display, there is generally a central controller for the various display monitors. The multiple video streams are typically routed through the central controller. The central controller typically includes a number of video capture devices which receive and encode video streams into digital data streams and a number of video controller devices to drive the individual pixels of the respective tiled display monitors of the display wall. Such central controllers typically experience debilitating data bottlenecks at the bus or buses through which the respective video data streams travel within the central controller.

The buses represent a bottleneck because the aggregate bandwidth required to handle all incoming signals and distribute those signals at high update rates to any combination of the display devices far exceeds die capacity of a single bus. A bus-oriented architecture may suffice in a small system with five to ten input and output devices, but bus-oriented architectures cannot be effectively scaled up to handle larger systems. In other words, doubling the number of video sources and destinations requires much more than a doubling of the number of buses to handle the requisite data transfer bandwidth increase resulting from such a doubling. Multiple buses can be used, each bus connecting a subset of input devices to a subset of output devices, but this leads to a loss in flexibility as to where each incoming video signal can be displayed. Specifically, a video stream from a particular input device would be displayable only on a selected few of the output display devices. Thus, the end user could not have free reign in determining where a particular video stream is to be displayed in a display wall.

What is needed is a more efficient interconnection mechanism between the capture devices and the display devices.

SUMMARY OF THE INVENTION

In accordance with the present invention, video data streams are routed between capture nodes and display nodes connected to one another through a high-bandwidth network switch and controlled by a stream manager connected to the switch. The stream manager selects an interchange format in which the video signal can be transported through the switch and communicates this interchange formal to the involved nodes. The interchange format is a format that is both producible by the involved capture nodes and displayable by the involved display nodes and that is optimized to provide a desired display quality without unnecessarily consuming, or exceeding, available bandwidth. Briefly stated, the preferred interchange format is the format that deliver the most fidelity that the source signal (as represented by the native interchange format) offers or the display device can effectively use (as represented by the displayable interchange format) without exceeding bandwidth limitations.

The result is that many, high-quality video streams can be routed through the switch at or near the full point-to-point bandwidth provided by the switch. In other words, the switch can handle multiple streams simultaneously whereas a bus is a shared resource that can process only a single stream at a time.

The stream manager controls the various streams between the capture nodes and the display nodes and includes a user interface by which a user can specify which of a number of video signals are to be displayed in what position within a display wall. To manage transportation of the various video streams through the switch, the stream manager identities the involved capture and display nodes, determines an interchange format of the video stream to be delivered between the capture and display nodes, and instructs the capture node to deliver the video stream in the interchange format to the display nodes. The stream manager instructs the capture and display nodes to send and receive, respectively, the subject video stream in the interchange format. Thereafter, the capture and display nodes cooperate to transport the video stream through the switch.

The capture and display nodes can be relatively simple devices that receive and serve requests from the stream manager and send and receive, respectively, video signals of various forms that can be selected by the stream manager. Accordingly, capture and display nodes can be implemented as relatively small electronic appliances. In addition, the use of a network switch as an interconnect between the capture and display nodes provides high bandwidth at low cost yet provides the flexible routing required in a display wall application.

Some video streams are sent to multiple display nodes because the video window is to span multiple tiled displays of a display wall. To improve the quality of a video signal that can be transported without exceeding available bandwidth, such video streams are divided such that the capture node avoids sending the same portion of a video stream to more than one display node. In other words, the stream manager instructs the capture node to send to each display node only that portion of the video stream that is displayable by that display node.

The display of multiple parts of a video stream is synchronized on a frame-by-frame basis by the capture node by broadcasting a synchronization packet which indicates that a particular frame of the video stream is ready for display. Display nodes delay display of each frame of a received video stream until a synchronization packet for the frame is received. Thus, all display nodes displaying respective parts of one video stream will show their respective parts of each frame of the video stream at the same time.

The stream manager is responsive to a graphical user interface and controls the various video streams through a network switch in accordance with user-generated signals, providing a user's experience that is indistinguishable from a user controlling a single integrated display. The stream manager allows capture and display nodes to cooperate directly with one another to transfer video streams, satisfactorily processing the extraordinary bandwidth required of a large display wall displaying many video streams in a scalable manner.

DETAILED DESCRIPTION

In accordance with the present invention, a stream manager 102 (FIG. 1) controls audiovisual data streams through a switch 104 from a number of capture nodes 106A-C to a number of display nodes 108A-D. In this illustrative embodiment, switch 104 is a gigabit (Gb) Ethernet switch capable of point-to-point data throughput of about one billion bits per second through each port. Switch 104 overcomes the disadvantages of traditional bus interconnections in which only one device can write through the bus at any given time. Switches such as switch 104 can achieve maximum rated throughput for multiple channels simultaneously. As used herein, an audiovisual data stream can include image streams and/or audio streams, and "video" is used to refer to any sequence of images that are temporally related to one another.

Each of capture nodes 106A-C has access to an audio and/or video data stream and makes that stream available to display nodes 108A-D through switch 104. As used herein, a "node" is any device or logic which can communicate through a network. Capture nodes 106A-C are analogous to one another and the following description of Capture node 106A is equally applicable to capture nodes 106B-C. Similarly, display nodes 108A-D are analogous to one another and the following description of display-node 108A is equally applicable to display nodes 108B-D.

Figure 1:
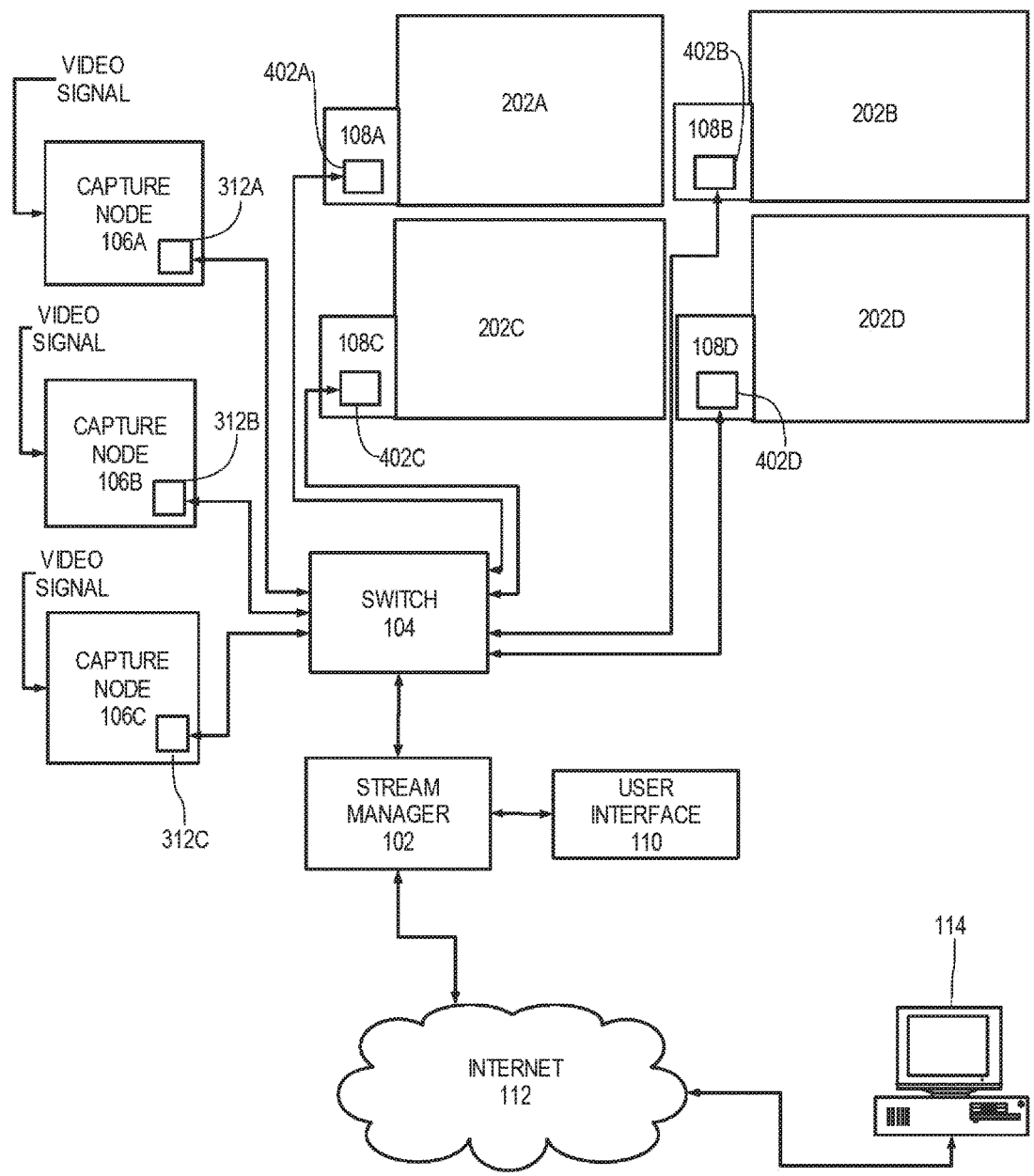
FIG. 1 is a block diagram showing a video stream distribution system in accordance with the present invention.

It should also be appreciated that, while three capture nodes 106A-C and four display nodes 108A-D are described herein, more or fewer capture and display nodes can be used in the audiovisual distribution system of FIG. 1. Similarly, while the network topology shown in FIG. 1 is particularly simple—e.g., involving a single network switch such as switch 104, more complex topologies can be used to distribute video signals in accordance with the present invention. In particular, switch 104 can be replaced with multiple interconnected switches, each of which can have many capture and display nodes attached. These interconnected switches can be in the same room or can be separated by miles or thousands of miles to provide a truly global means for acquisition, distribution, and display of audiovisual signals.

In addition, for capture and display nodes needing greater bandwidth, one or two additional links can be added to double or triple the amount of data that can be handled using link aggregation. For example, to double the bandwidth between switch 101 (FIG. 1) and display node 108A, two (2) 1.0-gigabit connections can couple switch 104 and display node 108A to one another. Similarly, capture node 106A can be coupled to switch 104 using two (2) 1.0-gigabit connections to effectively double the available bandwidth between capture node 106A and switch 104. Link aggregation—e.g., Cisco Fast EtherChannel, Gigabit EtherChannel, and 802.3AD—is known and is not described further herein.

To facilitate appreciation and understanding of the following description, the various audiovisual signal formats referred to herein are briefly described and summarized in a table below. Capture node 106A receives an audiovisual signal in a "native format" from a video source such as a DVD player or video camera or a computer. The native format can be analog or digital. The audiovisual signal can include video and/or audio signals, each of which is processed separately in this illustrative embodiment.

In a particularly simple example, the video source captured by capture node 106A is to be displayed, by itself, on display monitor 202A. In this example, display node 108A produces, and display monitor 202A receives and displays, a video signal in a "displayable format." The displayable format can be analog or digital and can be the same as the native format or different from the native format. The native format of the source and the display format of the display monitor are external constraints and define the task to be performed by capture node 106A and display node 108A. In particular, a video signal that is received by capture node 106A and that is to be displayed by display monitor 202A is to be displayed with as little loss of signal fidelity as possible—that is the task of capture node 106A and display node 108A.

Capture node 106A sends, and display node 108A receives, the video signal in an "interchange format" through switch 104. Interchange formats are digital. Capture node 106A and display node 108A can each support multiple interchange formats. In a manner described below, stream manager 102 selects a particular interchange format, referred to as the "selected interchange format" by which capture node 106A and display node 108A transport the video signal through switch 30. Stream manager 102 selects the selected interchange format according to the capabilities of the involved nodes, e.g., capture node 106A and display node 108A and the user's wishes as to how the video signal should be displayed.

As described above, capture node 106A captures the video signal from a video source. Capture node 106A represents the captured video signal in a digital form that is an interchange format that most accurately represents the video signal in the native format. The format of the captured video signal is sometimes referred to as the "native interchange format."

As described above, display node 108A produces the video signal in the displayable format for display by display monitor 202A. Display node 108A produces the video signal in the displayable format from an interchange format which most accurately represents the display-able format, and this interchange format is sometimes referred to as the "displayable interchange format."

It should be appreciated that the video distribution system described herein is not limited to this simple example of an entire single display monitor for displaying a single captured video signal. Instead, any video signal, regardless of its native format, can be displayed anywhere on the display wall in a window of any size. This allows multiple signals to be displayed on a single display monitor, one signal to be expanded to fill the entire display wall, or any combination of signals to be display in any configuration of any collection of display walls. Accordingly, the definition of the displayable interchange format changes somewhat in this distributed embodiment.

The displayable interchange format does not necessarily map to an entire display frame of display monitor 202A. Instead, the displayable interchange format represents only pixels of that portion of a window used to represent the video signal. For example, if a video signal is to be displayed in a 640,times,480-pixel window within a 1600, times, 1200 display monitor, the frame size of the displayable interchange format is 640 pixels by 480 pixels, i.e., the size of the display window within the display monitor. A video compositor, which is described more completely below, composites full frames for display by a display monitor to include any windows displaying video signals. Other parameters of the displayable interchange format are the same as in the single video signal in a single display monitor example—e.g., frame rate, color depth, and color model. It should be appreciated that the displayable interchange format is based on the size of the window displaying the video signal, even if the window spans multiple display monitors.

Thus, the overall video signal flow is as follows: Capture node 106A captures a video signal in the native format into the native interchange format and sends the video signal through switch 104 in the selected interchange format, converting the video signal from the native interchange format to the selected interchange format if the two are different from one another. Display node 108A receives the video signal and converts it from the selected interchange format to the displayable interchange format if the displayable interchange format is different from the selected interchange format. Display node 108A converts the video signal from the displayable interchange format to the displayable format, comporting full frames as required, for playback by display monitor 202A.

The various video format terms used wherein are summarized in the Table below. TABLE-US-00001. Term In the context of FIG. 1 Native Received by capture nodes 106A-C. format Native Preferred digital representation of the native format within interchange capture nodes 106A-C. format Displayable Driven by display nodes 108A-D to send to display format monitors 202A-D, respectively. Displayable Preferred digital format for compositing into frames for interchange conversion to displayable format, format Selected The particular interchange format in which the video signal interchange travels from the capture node, through switch 104, and format to the display node. Interchange A superset of the native interchange format, the displayable format interchange format, and the selected interchange format—and including any candidates for the selected interchange format.

The capture, conversion, sending, receipt, conversion, and display of the video signal all happen in real time. As used herein, "real time" means that an insubstantial amount of time is required for the video signal to travel from the video source through capture node 106A to display monitor 202 through display node 108A from a human user's perspective—e.g., no more than a few seconds. It is generally preferred that this amount of time is minimized, e.g., to no mart than a small fraction of a second, but the term "real time" is considered applicable so long as the video signal presented by display monitor 202A appears to be reasonably immediately responsive to a human user's control inputs into the video source attached to capture node 106A. To transport the video signal in real time, the capture, conversion, sending, receipt, conversion, and display of the audiovisual signal all happen concurrently.

A. Capture Nodes

Figure 3:
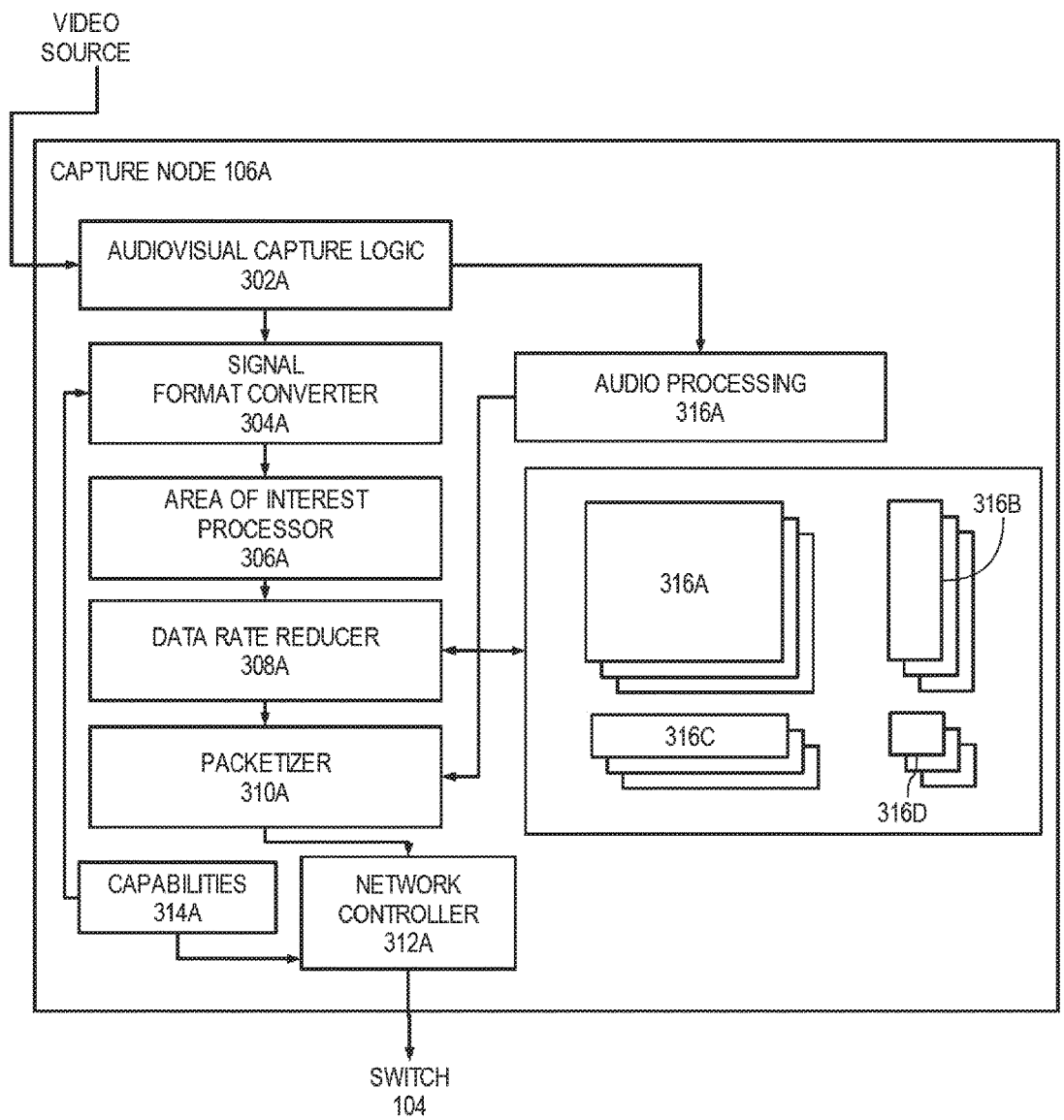
FIG. 3 is a block diagram of a capture node of FIG. 1 in greater detail.

Capture node 106A is shown in greater detail in FIG. 3. Capture node 106A includes audiovisual capture logic 302A that receives an audiovisual signal in the native format from a video source, e.g., an external device such as a computer, a video camera, a prerecorded video player, etc. The audiovisual signal captured by audiovisual capture logic 302A can be a video signal or an audio signal or a combination of video and audio signals. Processing of audio signals is described below. For simplicity, only video signals are described first. Audiovisual capture logic 302A converts the video signal from the native format to the native interchange form 11, which is typically a digital representation of the native format in which pixels are organized as frames with a frame size and frame rate specific to the native format. Audiovisual capture logic is generally known and can include signal conditioning elements to capture the signal in its best possible form.

Capture node 106A includes a signal format converter 304A that receives the captured video signal from audiovisual capture logic 302A and converts the video signal from the native interchange format to the selected interchange format. Such conversion can require changes to various parameters of the native interchange format, including frame size (i.e., the number of pixels per line and the number of lines per frame), frame rate, color depth, and aspect ratio, for example. Changes to the frame size by capture logic 302A is typically downscaling.

In one embodiment, signal format converter 304A performs operations to produce frame sizes and frame rates within a continuous range. Thus, the particular video interchange formats supported by signal format convener 304A can be expressed within capabilities 314A as including ranges of properties. In an alternative embodiment, signal format converter 304A performs only highly efficient operations such as omitting every other pixel and every other scanline to reduce frame sizes by integer ratios such as 2:1, 3:1. etc. In such an alternative embodiment of signal format converter 304A, supported video interchange formats are expressed within capabilities 314A as including individual, discrete values of supported properties. As described below in greater detail, capabilities 314A influence selection of the interchange format such that the selected interchange format is ensured to be one that capture node 106A supports.

Capture node 106A includes an area of interest processor 306A that forms one or more streams of data representing one or more corresponding areas of interest of the video signal in the selected interchange format produced by signal format converter 304A. As can be seen in display wall 200 (FIG. 2), a given video signal can be displayed across multiple display monitors. In addition, portions of a display of a video signal can be obscured by other windows of display wall 200 and/or can be not visible for other reasons. One such reason is the dragging of a window such that part of the window reaches beyond the outer edges of display wall 200. Each area of interest of the video signal is that portion of the video signal which is viewable within a single display monitor, and area of interest processor 306A (FIG. 3) forms a separate stream for each area of interest of the video signal received from signal format converter 304A. Stream manager 102 (FIG. 1), in conjunction with user interface 110, maintains data representing which portions of which video signals are displayed and visible on each display monitor and uses that data to control the areas of interest processed by area of interest processor 306A (FIG. 3).

Area of interest processor 306A divides the video signal received from signal format converter 304A in the selected interchange format into portions of the video signal destined for different display nodes. In one embodiment, area of interest processor 306A receives data from stream manager 102 indicating which portions of the video signal are to be displayed by each respective display node, and area of interest processor 306A determines to what extent each display node needs pixels beyond those of the portion. For example, upscaling a frame may involve pixel and/or scanline interpolation, requiring access of pixels just outside the particular portion displayed by a particular display node. Area of interest processor 102 can determine that, to properly up-scale the portion of window 204A (FIG. 2), display node 108A requires additional pixels that are not within the portion of window 204A but that are within a predetermined distance of the portion of window 204A. In an alternative embodiment, stream manager 102 determines which pixels each of the respective display nodes needs to accurately represent pixels displayed thereby. In particular, stream manager 102 determines which extra pixels, if any, are needed by each of the display nodes in this alternative embodiment and communicates to capture node 106A exactly which pixels to send to each of the involved display nodes.

In an alternative embodiment, the entirety of the video signal can be sent to all involved display nodes simultaneous. For example, capture node 106A can use multicast addressing to send the same video signal to multiple display nodes. Multicast addressing is conventional and known and is not described further herein.

In this illustrative embodiment, the areas of interest processed by area of interest processor 306A also exclude those portions of the video signal captured by capture node 106A that are occluded or otherwise not visible, except that the edges of the areas of interest are similarly extended when the receiving display node is expected to perform upscaling or other processing that requires such extra pixels.

Figure 2:
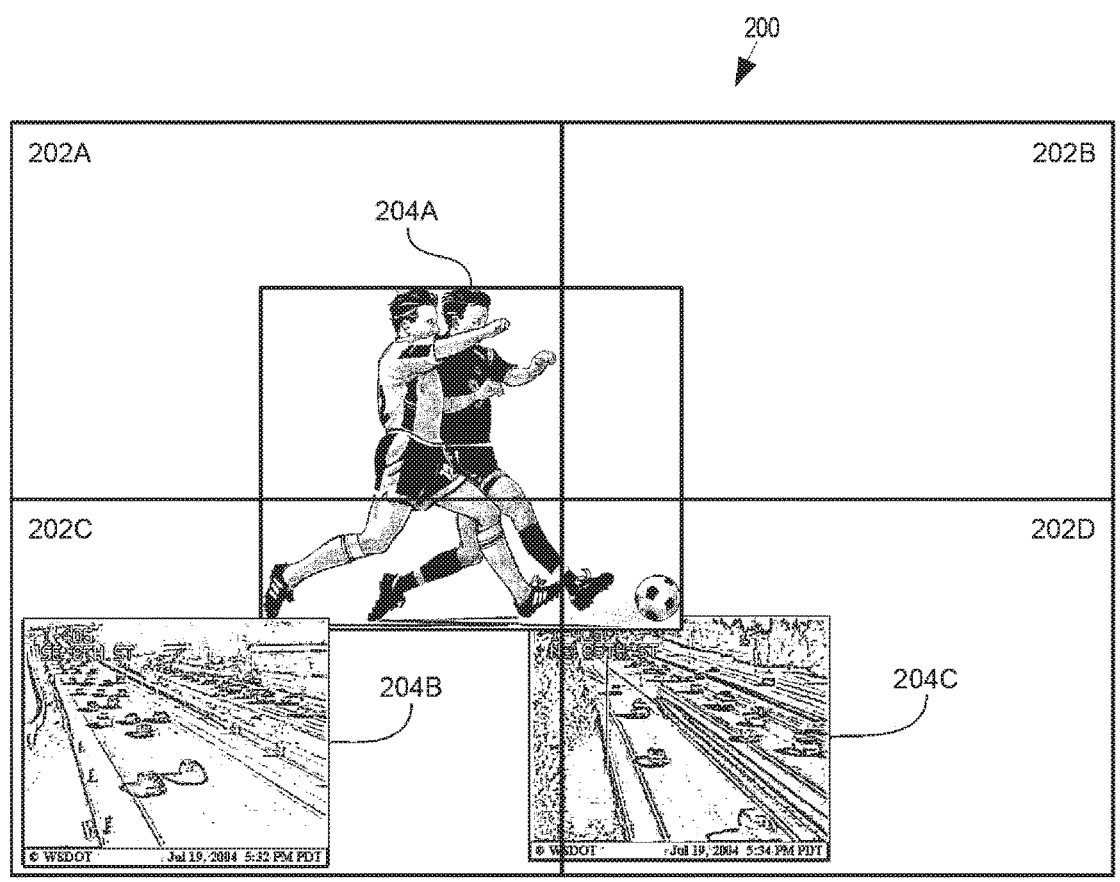
FIG. 2 is an illustration of a display wall to show video streams as displayed in accordance with the present invention.

Area of interest processor 306A forms one video stream for each of the portions resulting from division of the video signal. For example, in processing the video signal of window 204A, which spans four (4) displays as shown in FIG. 2, area of interest processor 306A produces four (4) separate video streams, each representing a respective area of interest of the video signal, and each of which is destined for a different display node in this example.

It should be observed that, in this illustrative embodiment, signal format converter 304A precedes area of interest processor 306A in the sequence shown in FIG. 3. Accordingly, a single selected interchange format applies to the entirety of the video signal processed by capture node 106A.

A data rate reducer 308A of capture rode 106A receives multiple video streams in the selected interchange format, each representing a portion of the video stream destined for a particular one of the involved display nodes, and data rate reducer 308A processes each portion independently. Data rate reducer 308A can apply any of a number of data rate reduction techniques to each video stream, such as redundancy avoidance, lossless compression, and lossy compression, for example. Redundancy avoidance can be spatial, as in selective use of run-length encoding, or temporal, as in avoiding sending pixels which are not changed from the preceding frame of the video stream.

Redundancy avoidance, lossless compression, and lossy compression can require access to pixel data of one or more previous frames of a video signal. Accordingly, data rate reducer 308A stores one or more previous scans of each area of interest. As used herein, a scan is an area of interest of a single frame, and a stream of area of interest scans collectively represents the area of interest of a video stream. The previous scans stored by data rate reducer 308A include, for example, (i) previous scans 316A of the area of interest of window 204A (FIG. 2) for display node 108A; (ii) previous scans 316B (FIG. 3) of the area of interest of window 204A (FIG. 2) for display node 108B; (iii) previous scans 316C (FIG. 3) of the area of interol of window 204A (FIG. 2) for display node 108C; and (iv) previous scans 316D (FIG. 3) of the area of interest of window 204A (FIG. 2) for display node 108D. In an alternative embodiment, area of interest processor 306A stores these previous scans for subsequent use by data rate reducer 308A. In either case, data rate reducer 308A has access to such previous scans for redundancy avoidance and compression, whether lossy or lossless.

Capture node 106A includes a packetizer 310A that forms packers of data that serialize and collectively represent each of the streams processed by data rate reducer 308A. As used herein, a "packet" is any collection of data to be transported together and that includes data specifying an intended destination. The video signals represented in the packets include data marking the end of each scan line and the end of each frame portion to assist in display of the video signal by display nodes 108A-D. In addition, packetizer 310A cooperates with network controller 312A to maximize packet sizes, up to a predetermined maximum, to thereby minimize the overhead of sending many small packets.

Capture node 106A includes a network controller 312A that interacts with stream manager 102 (FIG. 1) and any of display nodes 108A-D to control the series of packets and to send the series of packets through switch 104. Capabilities 314A identify the interchange formats that are supported by capture node 106A by storing data identifying ranges of values and/or individual discrete values of various properties of the supported interchange formats. Capabilities 314A also identity characteristics of the native interchange format and supported flow control methods implemented by network controller 312A in this illustrative embodiment. The cooperation between network controller 312A, stream manager 102, and any involved display nodes to agree upon the selected interchange format and to effect transfer of the audiovisual signal in the selected interchange format is described below.

B. Display Nodes

Display nodes 108A-D receive the video streams through switch 104 and display video signals represented in the various streams on respective ones of display monitors 202A-D. As used herein, display monitors include generally any device for displaying images including, for example. LCD displays. CRT displays, plasma displays, and display projectors. Display monitors 202A-D are plated next to one another to collectively form a tiled display wall 200 as shown in FIG. 2. Of course, it should be appreciated that display walls can have other configurations of display monitors. including more or fewer than the four display monitors shown in FIG. 2. In addition, it should be appreciated that, in addition to those display nodes which collectively provide display wall 200, other additional display nodes can be coupled to switch 104. In particular, the display nodes coupled to switch 104, or a multitude of interconnected switches, can represent one or more display walls and or one or more discrete, individual displays. For simplicity and clarity of description, the illustrative example described herein includes four display nodes 108A-D (FIG. 1) which collectively control a single display wall 200 (FIG. 2).

In display wall 200 of FIG. 2, three video signals are displayed, each of which is displayed in a respective window in the collective display of display wall 200. Windows 204A-C can span multiple display monitors 202A-D and can overlap one another as shown. While only three video windows are shown, it should be appreciated that more or fewer windows can be displayed in display wall 200. In addition, other items can be displayed in (he collective display of display wall 200 such as graphical user interface components, for example.

The organization of content of display wall 200 is specified by a user through a user interface 110 (FIG. 1). In this illustrative embodiment, user interface 110 implements a window manager with a graphical user interface. Window managers are known components of graphics-based operating systems and are not described herein. Let it suffice to say that the user is provided with conventional user interface techniques to open, close, move, and resize windows such as windows 204A-C (FIG. 2). User interface 110 is responsive to signals generated by a user through physical manipulation of one or more user input devices in a known and conventional manner.

Stream manager 102 controls the location of windows 204A-C in accordance with window content and location information received from user interface 110 by sending commands through switch 104 to capture nodes 106A-C and display nodes 108A-D.

Figure 4:
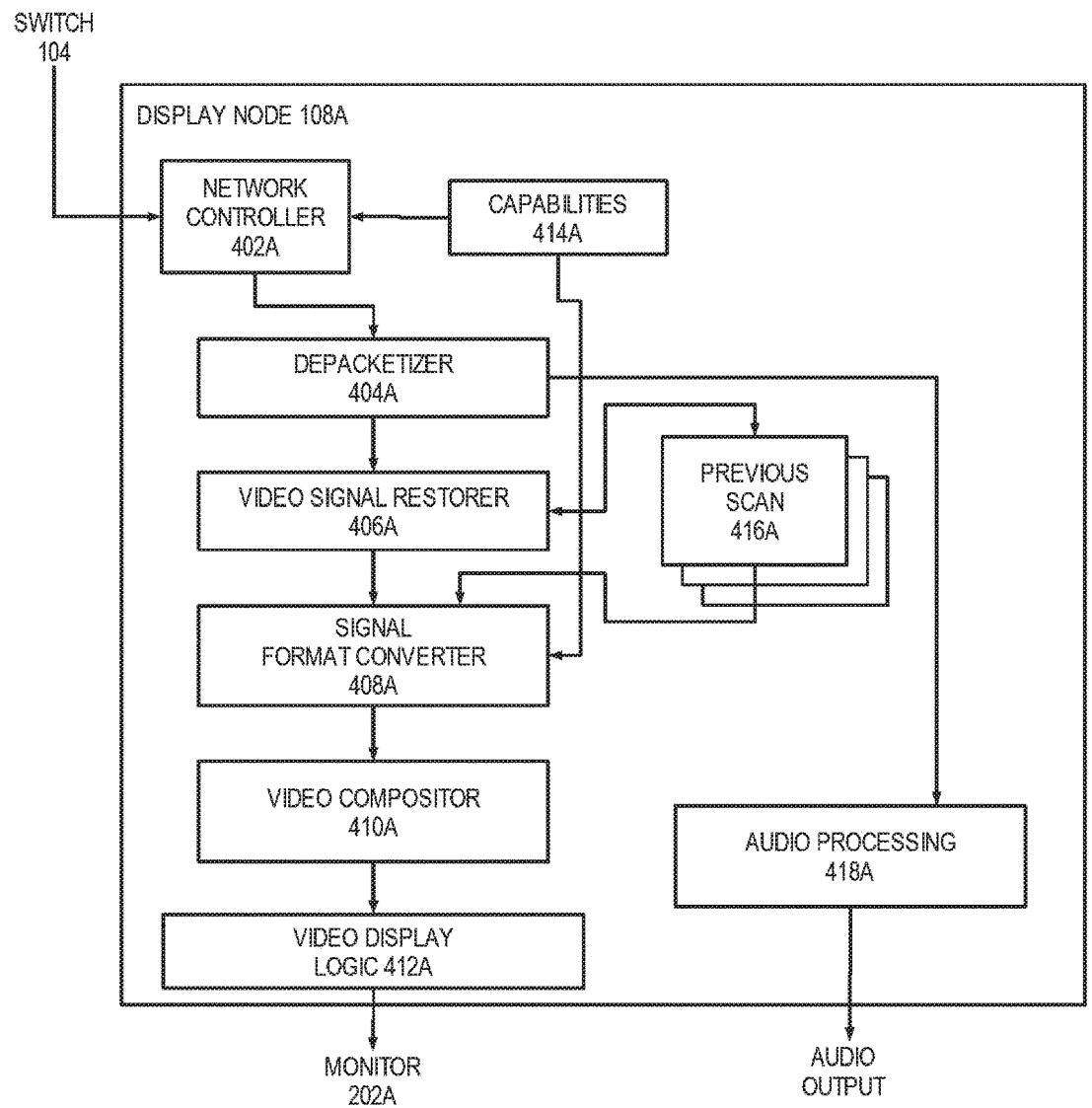
FIG. 4 is a block diagram of a display node of FIG. 1 in greater detail.

Display node 108A is shown in greater detail in FIG. 4. Display node 108A includes a network controller 402A and display logic 412A. Network controller 402A cooperates with stream manager 102 (FIG. 1) und any of capture nodes 106A-C to select an interchange format and to effect receipt of each of one or more video data streams through switch 104, Network controller 402a sends the received video data streams to depacketizer 404A.

Depacketizer 404A reconstructs individual data streams representing respective portions of video signals from capture nodes 106A-C from the packers received through switch 104. In particular, depacketizer 404A extracts the substantive content (sometimes referred to as data payload) from the packets and sequences the content if any packets are received out of order. In some embodiments, display node 108A can be coupled to switch 104 through more than one network port, e.g., using link aggregation. In such circumstances, packets can be received out of order if the packets travel through multiple ports of switch 104. Depacketizer 404A re-sequences the content of the packets such that the order is preserved. Packets can each include a packet sequence number to facilitate the re-sequencing by depacketizer 404A.

From the substantive content extracted from the packets, depacketizer 404A forms multiple data streams, each of which represents an individual video or audio signal. Within each data stream, data marking beginning and/or ending of scan lines and frames is included. It should be appreciated that, from the perspective of a display node, a portion of a video signal that is less than the entirety of the video signal appears to be, and is treated as, an entire complete video signal.

Display node 108A includes a signal restorer 406A that receives the data streams from depacketizer 404A and restores full video signals represented by the respective data streams. In particular, signal restorer 406A applies the inverse of any data rate reduction techniques applied by data rate reducer 308A (FIG. 3), including restoration of redundancies and reversal of any applied lossless and/or lossy compression techniques.

To restore redundant data that may have been removed by data rate reducer 108A from an area of interest stream, signal restorer 406A (FIG. 4) maintains one or more previous scans, e.g., previous scan 416A, which represent the most recently reconstructed scans of each received area of interest stream for display node 108A. Each previous scan represents a previously received scan of the area of interest of display node 108A that has been restored by signal restorer 406A. Thus, if a scan line is omitted us redundant in view of the corresponding scan line of the previous corresponding area of interest scan, signal restorer 406A substitutes the corresponding scan line of previous scan 416A for the omitted scan tine.

In addition, signal restorer 406A applies the reverse of any compression techniques applied by data rate reducer 308A (FIG. 3). Such decompression can require reference to pixels of previous scan 416A (FIG. 4) and/or reference to near pixels in the same area of interest.

Signal restorer 406A produces one or more separate data streams, each of which represents a single area of interest stream or audio signal. Bach area of interest stream a complete in that all pixels of each scan line and all scan lines of each scan of each area of interest are represented completely and independently, i.e., without requiring reference to another pixel. In addition, data marking beginning and/or ending of scan lines and scans of the area of interest is included in each area of interest stream.

Display node 108A includes a signal format converter 408A that converts each of the one or more video data streams received from signal restorer 406A from the respective selected interchange format into a form suitable for processing by video compositor 410A, i.e., the respective displayable interchange format. Such conversion can require modification of such parameters as frame size, frame rate, color depth, and aspect ratio, for example. It should be appreciated that some parameters corresponding to the captured image stream as a whole, e.g., frame size, have a different meaning in the context of an area of interest. For example, when processing an area of interest that is less than the entirety of a frame, image stream format converter 408A does not modify the frame size of an entire captured frame of a video signal but instead adjusts the scale of scans of the area of interest to march a displayed frame size. Signal formal converter 408A can support ranges of values of various properties of the audiovisual data stream and/or can be limited to specific discrete values of such properties in the manner described above with respect to signal formal converter 304A. Those supported values are represented in capabilities 414A.

To convert the video signals, signal format converter 408A stores data representing the selected interchange format and the display interchange format for each video stream received by display node 108A (FIG. 4). Network controller 402A forwards information regarding the selected interchange format to signal formal converter 408A at the start of each new stream at the request of stream controller 102 (FIG. 1). The displayable interchange format for a particular video stream depends on the sixe of the window in which the stream is to be displayed. The number of physical scan tines and the number of pixels across each scan line within the urea of interest of display monitor 202A (FIG. 2) defined by window 204A correspond to the frame size of the displayable interchange format for the video stream of window 204A. Other aspects of the displayable format are defined by the particular type or types of video signals displayable by display monitor 202A, such as color space, color depth, interlaced or progressively scanned frames, and frame rate, for example.

Conversion from the selected interchange format to the displayable interchange format by signal format converter 408A (FIG. 12) for a particular video signal can require access to spatially or temporally near pixels. For example, de-interlacing can require access to previous fields, e.g., for application of motion compensation. Similarly, upscaling a scan of an area of interest can require interpolation between adjacent pixels. Accordingly, signal format converter 408A has access to previous scan 416A stored by signal restorer 406A.

Signal format converter 408A produces area of interest streams each of which is in a respective displayable interchange format. The area of interest streams in the respective displayable interchange formats match. pixel-for-pixel, with a portion of the frame layout of display monitor 202A and that portion is defined by stream manager 102 as representing a corresponding window, e.g. window 202A (FIG. 2).

Display node 108A includes a video compositor 410A that assembles respective portions of respective area of interest streams processed by signal format converter 408A into individual frames of a complete video display, e.g., a complete frame for display by display monitor 202A (FIG. 1). Such assembly—sometimes referred to as compositing—is described more completely in the co-pending and commonly owned U.S. patent application Ser. No. 10/795,088 filed Mar. 4, 2004 by Eric Wogsberg and entitled "Compositing Multiple Full-Motion Video Streams for Display on a Video Monitor" and published as USPTO Publication No. 2003/0195206, and that publication is incorporated herein in its entirely by reference.

Video compositor 410A receives these area of interest streams from signal format convener 408A. In addition, video compositor 410A stores data representing corresponding locations within display monitor 202A (FIG. 2) at which specific areas of interest are to be displayed. Such provides the necessary mapping of pixels of each area of interest stream to a location within display monitor 202A. Video compositor 410A (FIG. 12) composites scans of the one or more areas of interest into complete frames for display in display monitor 202A. The result of such compositing is a complete frame ready for display in display monitor 202A by display logic 412A (FIG. 4).

Display node 108A includes display logic 412A that drives the video signal in the displayable video format to display monitor 202A for display. Such driving may require conversion of the video signal in the displayable interchange format to the displayable formal, which can be an analog format, much like video circuitry in personal computers drives display of analog and/or digital computer display monitors.

Display node 108A includes capabilities 414A that represent the ranges and/or discrete values of various properties of interchange formats supported by signal format converter 408A and used by network controller 402A to select an interchange format for transport of video signals through switch 104. Capabilities 414A also represent the displayable format produced by display node 108A. Capabilities 414A can be static and established during initial configuration of display node 108A or can be discovered, at least in part, from display monitor 202A using a conventional plug-and-play device discovery process such as the use of VESA's DDC/EDID (Display Data Channel/Extended Display Identification Data) to obtain operational limits of a display device. Display node 108A determines the best supported characteristics—i.e., video format and timing—of display monitor 202A that display node 108A can drive and selects a displayable format according to those characteristics. In addition, capabilities 414A identify any higher-level signal processing capabilities of display node 108A such as de-interlacing, for example.

C. Interface Between Stream Manager and Capture and Display Nodes

To implement the distribution of video data streams in the manner described herein, capture nodes 106A-D implement a number of operations that can be requested by stream manager 102. Collectively, these operations allow stream manager 102 to gather information regarding capture nodes 106A-C, specify characteristics of video streams sent by capture nodes 106A-C, specify to which display nodes such streams are sent, and to start and stop sending of such streams. These operations are briefly introduced here and described in more detail below.

Network controller 312A (FIG. 3) implements operations (i) to register capture node 106A; (ii) to report and accept various parameters of audio and video data processed through signal format converter 304A, area of interest processor 306A, and data rate reducer 308A; (iii) to report and accept a capture node identifier; (iv) to report and accept positioning information and a clock signal; (v) to report and accept information about display nodes to which video data streams are being sent; (vi) to open and close video and/or audio data streams; and (vii) to initiate or terminate a video or audio data stream.

Network controller 402A (FIG. 4) of display node 108A similarly implements operations (i) to register display node 108A, (ii) to report and accept various parameters of audio and video data processed by display node 108A, (iii) to report and accept a display node identifier, (iv) to report and accept positioning information and a clock signal, (v) to report and accept information about capture nodes from which video and/or audio data streams are being received, (vi) to open and close video data streams, (vii) to initiate or terminate receipt of a video or audio data stream, and (vii) to suggest to a capture node changes to the selected interchange format and/or changes in applied data rate reduction techniques. Collectively, these operations allow stream manager 102 to gather information regarding display nodes 108A-D, specify characteristics of video and/or audio data streams received by display nodes 108A-D, and to start and stop receiving of such streams. In addition, once a stream is started between a capture node and a display node, the display node is able to suggest, and the capture node is able to accept, changes in the selected interchange format and/or applied data rate reduction techniques.

Figure 5:
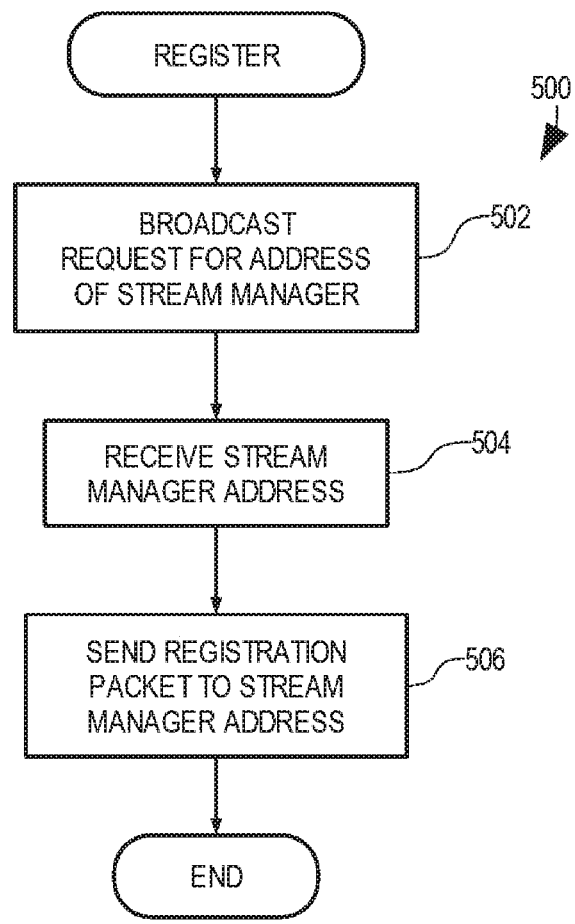
FIG. 5 is a logic flow diagram of the registration of a capture node in accordance with the present invention.

Registration by a capture node or a display node is illustrated as logic flow diagram 500 (FIG. 5). Logic flow diagram 500 is described in the context of capture node 106A and is equally applicable to registration by capture nodes 106B-C and display nodes 108A-D.

Initially, i.e., when capture node 106A is first operational and in communication with switch 104, stream manager 102 is unaware of the presence of capture node 106A and network controller 312A has no network address at which to register with stream manager 102. In step 502, network controller 312A broadcasts a request for an address of stream manager 102 through switch 104. Stream manager 102 receives the broadcast request and responds to such a request by returning its address to the node from which the request was broadcast. In step 504, network controller 312A receives the address of stream manager 102. Thus, after step 504, capture node 106A and stream manager 102 are aware of each other and can send messages between one another. In this illustrative embodiment, the address of stream manager 102 is the MAC (Media Access Controller) address of network access circuitry of stream manager 102. Of course, other address schemes can be used, such as Internet Protocol (IP) addresses.

The request broadcast of step 502 and the response of step 504 collectively represent one way by which network controller 312A can discover the address of stream manager 102. Of course, network controller 312A can discover the address of stream manager 102 in other ways, such as manual programming of the address into network controller 312A. However, one advantage of the broadcast request is that network controller 312A can provide what is commonly referred to as plug-and-play functionality—i.e., requiring no configuration for initial functionality other than coupling to a network to which stream manager 102 is also coupled.

In step 506, network controller 312A forms and sends a registration packet to stream manager 102 through switch 104 using the address received in step 504. Network controller 312A forms the registration packet by including data to inform stream manager 102 of the identity, properties, and capabilities of capture node 106A. The identity of capture node 106A can be indicated by the MAC or other address of capture node 106A. can include an identifier unique among capture nodes 106A-C, and/or can include a brief description of capture node 106A such as "Interstate 5 traffic camera number 15." The properties of capture node 106A can include geolocation and/or positioning information related to the captured video signal. For example, the geolocation information can identify a location of a camera in latitude and longitude coordinates. Similarly, the positioning information can identify the direction and elevation angle of the camera.

The capabilities information included in the registration packet from capture node 106A (FIG. 1) inform stream manager 102 of the various capabilities of capture node 106A, e.g., as represented in capabilities 314A (FIG. 3). For each of a number of properties of a video stream, network controller 312A sends data representing one or more values for that property supported by capture node 106A. Par example, the capabilities information can indicate which video frame resolutions, frame rates, color depths, color models, audio encoding parameters, video encoding parameters, compression techniques, etc. are supported by capture node 106A. As described above, such capabilities can be expressed as ranges of values and/or discrete values. Since capture nodes can also process audio streams as described above, the capabilities information can indicate similar capabilities with respect to audio data streams. In addition, network controller 312A specifics the native interchange format in the registration packet sent in step 506.

Registration by network controller 402A (FIG. 4) of display node 108A is generally analogous to registration by network controller 312A (FIG. 3) except that geolocation information is omitted in some embodiments and positioning information indicates a position, e.g., row and column, of associated display monitor 202A within display wall 200 (FIG. 2) and can identify display wall 200 uniquely within a collection of two or more display walls served by stream manager 102. In addition, network controller 402A specifies the displayable interchange format rather than a native interchange format.

To report position information of each display node, such information is programmed into each display node at the tine of network configuration in this illustrative embodiment. In an alternative embodiment, such position information is programmed into stream manager 102, e.g., as a pairing of unique display node identifiers (such as MAC addresses) to corresponding position information. In either case, stream manager 102 is able to determine which display nodes are to display which parts of u video window spanning multiple displays of a display wall.

In this illustrative embodiment, capture nodes 106A-C and display nodes 108A-D are configured to execute the registration operation upon power-up and detection of a good connection to switch 104. In addition, the broadcast of step 502 is repeated periodically if no response is received from stream manager 102. At power-up, stream manager 102 is configured to respond to requests for the address of stream manager 102 and to receive registrations from capture nodes and display nodes. Thus, initialization of the audiovisual stream distribution system of FIG. 1 can be as simple as plugging in connecting cables between—and powering on—capture nodes 106A-C, display nodes 108A-D, stream manager 102, and switch 104.

Figure 6:
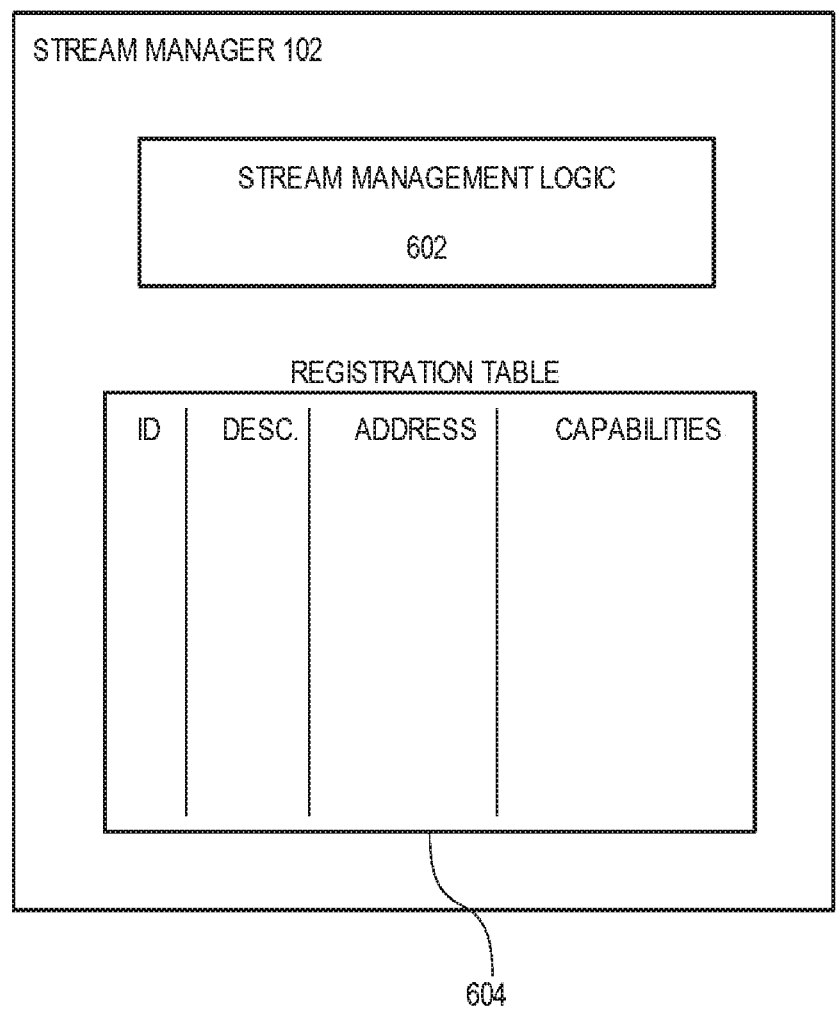
FIG. 6 is a block diagram showing components of the stream manager of FIG. 1 in greater detail.

After registration of capture nodes 106A-C and display nodes 108A-D, stream manager 102 stores identifiers, descriptions, addresses, and capabilities of capture nodes 106A-C and display nodes 108A-D in a registration table 604 (FIG. 6). Stream manager 102 includes stream management logic 602 that uses the information of registration table 604 to manage audiovisual data streams between capture nodes 106A-C and display nodes 108A-D.

D. Movement of a Video Stream from a Capture Node to One or More Display Nodes

As described above, the entirety of display wall 200 (FIG. 2) is controlled by user interface 110 (FIG. 1), which implements a window manager or other graphics-based operating system. User interface 110 includes a conventional interface by which the user directs that a video signal be displayed in a specified location within display wall 200. For example, the user can initiate execution of a process that presents a video stream selection user-interface dialog and displays the selected video stream in a window that the user can later move and/or resize within display wall 200. For the purposes of illustration, consider that the user has directed the display of window 204A (FIG. 2) in the position shown. In this illustrative example, the video stream representing the video content of window 204A is sometimes referred to as the selected video stream.

Figure 7:
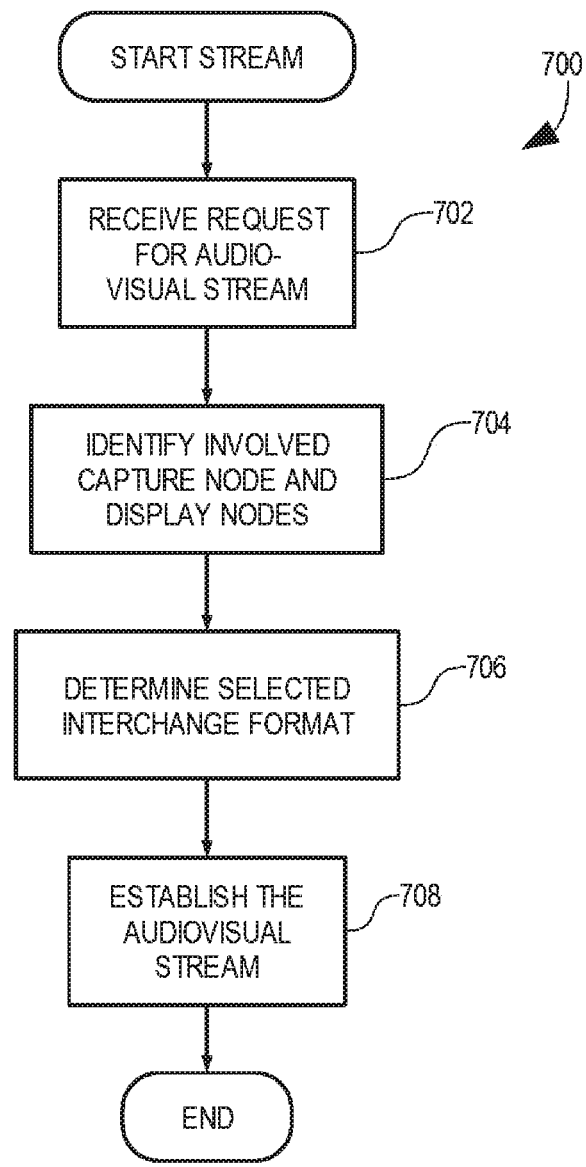
FIG. 7 is a logic flow diagram of the initiation of a video stream from a capture node to one or more display nodes by the stream manager.

Initiation of display of the selected video stream by stream manager 102 is illustrated by logic flow diagram 700 (FIG. 7). In step 702, stream manager 102 receives the request to start the selected video stream at the location shown in FIG. 2. In step 704 (FIG. 7), stream manager 102 determines which capture node and which one or more display nodes are involved in the selected video stream. Generally, one of capture nodes 106A-C (FIG. 1) will be involved since generally each video stream is displayed in its own window within display wall 200. The involved one of capture nodes 106A-C is identified as the one providing the selected video stream. For example, if the user had selected a video stream with the description "Interstate 5 traffic camera number 15." the identifier and address associated with that description within registration table 604 (FIG. 6) identifies the involved one of capture nodes 106A-C (FIG. 1). In this illustrative example, the involved capture node is capture node 106A.

Stream manager 102 determines the one or more involved display nodes 108A-D by determining the entire display position of the specified display window, e.g., window 204A (FIG. 2) in this illustrative example. Using simple pixel arithmetic, stream manager 102 (FIG. 1) determines that all of display nodes 108A-D are involved in this illustrative example since each of display nodes 108A-D displays a respective portion of window 204A as shown in FIG. 2.

1. Selection of the Interchange Format

In step 706 (FIG. 7), stream manager 102 selects an interchange format of the selected video stream to represent the video of window 204A. The primary concern in selecting an interchange formal is the preservation of the quality of the video signal to the greatest extent possible. To the extent any characteristic of the video signal is modified to reduce data rate (e.g., down-scaling the frame size), it is preferred that such conversion is performed by the involved capture node, e.g., capture node 106A. Such reduces the amount of data bandwidth required at the capture node, through switch 104, and at the display node without any degradation of the video signal beyond that required by the native interchange format and the displayable interchange format. Conversely, to the extent any characteristic of the audiovisual signal is modified to increase data rate (e.g., up-scaling the frame size), it is preferred that such conversion is performed by the involved display node, e.g., display node 108A. Such avoids excessive consumption of bandwidth through switch 104. However, it should be noted that, unlike most other systems, avoiding excessive consumption of bandwidth is not the primary concern. Bandwidth is generally only a concern (i) if the audiovisual signal in the selected interchange format would exceed available bandwidth or (ii) when selecting whether a capture node or a display node is to perform a particular component of video signal processing.

Thus, as a general rule, any required down-sealing is performed by a capture node and any required up-scaling is performed by a display node. One way to implement this general rule is to limit characteristics of the selected interchange formal to the lesser of the characteristics of the native interchange formal and the displayable interchange format. By not exceeding characteristics of the native interchange format, any modifications of the audiovisual signal that increase the data rate of the audiovisual signal are performed by the display node after the signal has been transported through switch 104, thereby avoiding unnecessary DSC of data bandwidth through switch 104. Use of bandwidth is unnecessary when such use does not serve to maximize fidelity to the video stream in the native interchange format. By not exceeding characteristics of the display/able interchange format, any modifications of the audiovisual signal that reduce the data rate of the audiovisual signal are performed by the capture node, before the signal has been transported through switch 104, thereby similarly avoiding unnecessary use of data bandwidth through switch 104. In such cases, the saved bandwidth is unnecessary since the excess data represents more signal than the display node can fully utilize.

Under some circumstances, some of which are described below, the interchange format selected in the manner described above is estimated to exceed the available bandwidth of a port of switch 104, thereby likely to result in failure to deliver the video signal through switch 104. If the selected interchange format is estimated to exceed available bandwidth through switch 104 to the intended display node, the selected interchange format is modified by application of data rate reduction techniques that are described in greater detail below. In this illustrative embodiment, the available bandwidth of a single port of switch 104 for data payload is a predetermined proportion (e.g., 90%) of the total available bandwidth of that port. For example, if a data connection through a particular port of switch 104, e.g., the port of switch 104 to which capture node 106A is connected, is established at 1 gigabit per second, the available bandwidth of that port to capture node 106A is 900 megabits per second.

In addition, as described more completely below, stream manager 102 can limit available bandwidth to even less of the total bandwidth between capture node 106A and switch 104—particularly when capture node 106A is sending more than a single video data stream through switch 104.

Figure 8:
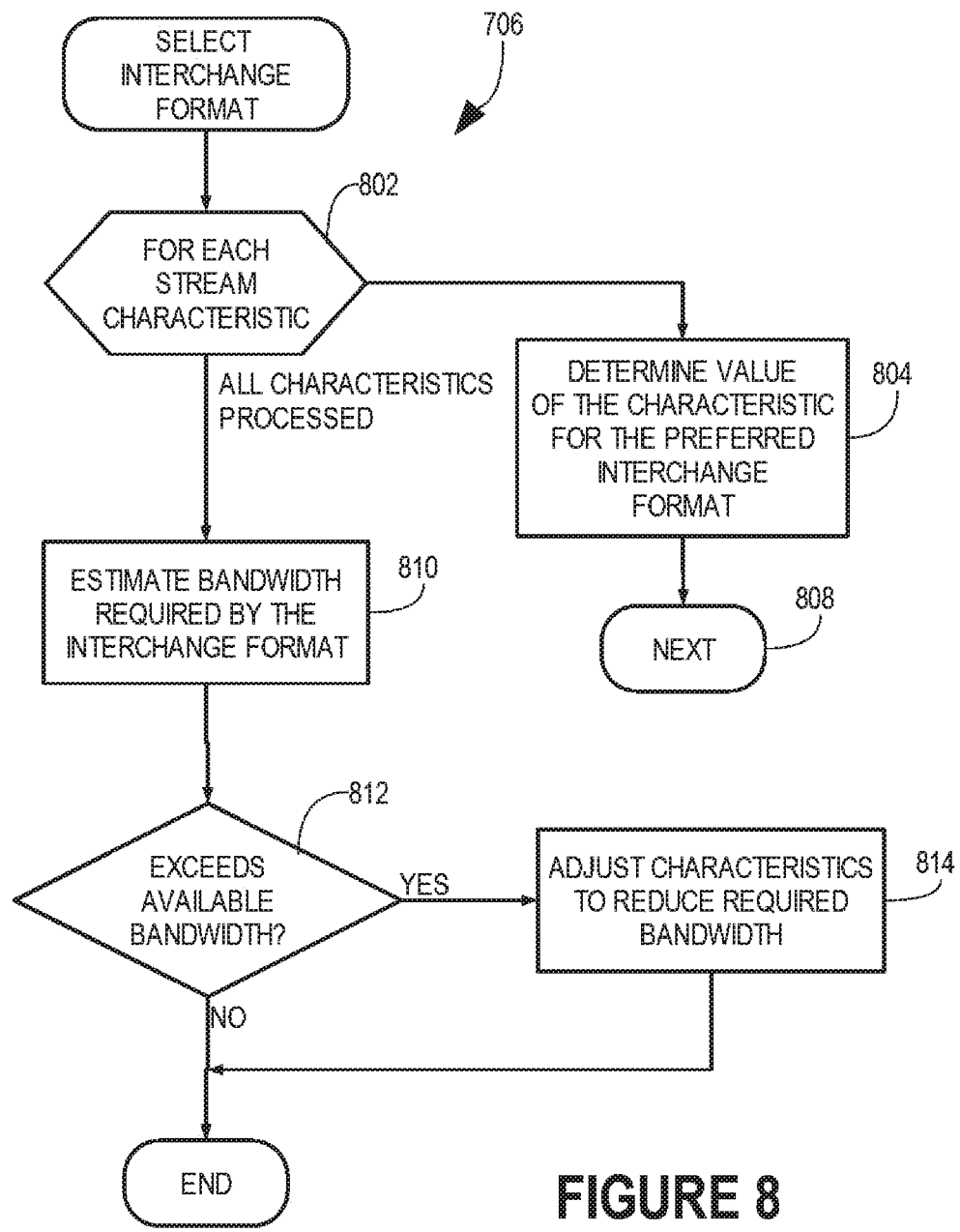
FIG. 8 is a logic flow diagram of the selection of an interchange format of the video stream by the stream manager in accordance with the present invention.

Step 706 is shown in greater detail as logic flow diagram 706 (FIG. 8). Loop step 802 and next step 808 define a loop in which stream manager 102 processes each of a number of various characteristics specified in capabilities 314A and 414A according to step 104. Such characteristics include frame size, frame rate, color depth, color space, etc. For each such characteristic, processing transfers from loop step 802 to step 804.

In step 804, stream manager 102 determines the value of the subject characteristic for the selected interchange format. As described briefly above, the selected interchange format is the interchange format that deliver; the most fidelity that the native interchange format offers or the displayable interchange format can effectively use without exceeding bandwidth limitations, in this illustrative embodiment, stream manager 102 defers bandwidth considerations until steps 812-814, which are described below. Thus, the immediate concern in step 804 is the particular value of the characteristic that delivers the most fidelity that the native interchange format offers and the displayable interchange format can effectively use.

This determination depends largely on the nature of the characteristic under consideration. Some characteristics are fairly straightforward. For example, frame size represents a number of scanlines and a number of pixels per scanline. The greatest fidelity of the native interchange format is a frame size of exactly the same dimensions. If the displayable interchange format is capable of including each and every pixel of each frame of this size, the dimensions of the native interchange format are used for the selected interchange format. Conversely, if like displayable interchange formal cannot display all pixels of frames of that size, the frame size of the selected interchange format is one that does not include pixels that cannot be represented in the displayable interchange format. Specifically, if the frame size of the displayable interchange format is smaller than the frame size of the native interchange format, the selected interchange format uses the frame size of the displayable interchange format. Other straightforward characteristics include such things as frame rates and color depth.

Other characteristics are not so straightforward. For example, the color model can be RGB or YCrCb, among others. If the native interchange format represents colors using the YCrCb model and the displayable interchange format represents colors using the RGB color model, the audiovisual signal undergoes color model conversion. However, it's less clear whether such color model conversion is best performed by capture node 106A or display node 108A. This issue can be resolved in any of a number of ways. For example, capabilities 314A and 414A can indicate that only display node 108A is capable of such color model conversion. In this case, the selected interchange format represents pixels in the YCrCb color model since capture node 106A is not capable of converting the color model to RGB. One feature that tends to require significant processing is de-interlacing. For cost reduction, it is useful to implement de-interlacing in only one of capture node 106A and display node 108A. Whether the selected interchange format includes interlaced or progressive scan video depends upon the native interchange format, the displayable interchange format, and which of capture node 106A and display node 108A can perform de-interlacing.

These same principles of preserving the most fidelity of the native interchange format to the extent the displayable interchange format can effectively use that fidelity are applied across each characteristic of the selected interchange format in the loop of steps 802-808.

When stream manager 102 has processed all characteristics of the selected interchange format according to the loop of steps 802-808. processing according to the loop of steps 802-808 completes. At this point, stream manager 102 has determined a selected interchange format such that each selected characteristic is an optimum selection for preservation of audiovisual signal quality without unnecessary use of bandwidth through switch 104 to represent data that can't be effectively used by the involved display nodes.

2. Selection of Data-Rate Reduction Techniques

After the loop of steps 802-808 (FIG. 8), processing according to logic flow diagram 706 transfers to step 810. In step 810, stream manager 102 estimates the data rate associated with the selected interchange format selected according to the loop of steps 802-808. Data rate estimation can be as simple as the product of (i) the frame rate (frames per second), the resolution (pixels per frame), and (iii) the pixel depth (bits per pixel)—plus any data overhead such as time-stamps, frame-start, and scanline-start markers and packet data overhead. The result is an estimated data rate in bits per second.

In test step 812, stream manager 102 determines whether the estimated data rate exceeds the available bandwidth through switch 104. In this illustrative embodiment, switch 104 supports 1000BaseT connections and can support up to one gigabit per second data throughput. However, actual available bandwidth through a single port of switch 104 can be a bit less than one gigabit per second.

In addition, the available bandwidth between capture node 106A and an involved display node, e.g., display node 108A, can be even less if display node 108A receives video and/or audio data streams from multiple capture nodes. In such cases, stream manager 102 allocates a data rate associated with display node 108A to capture node 106A. In addition, capture node 106A and/or display node 108A can effectively double their respective available bandwidth using link aggregation. The bandwidth available to the various nodes in the system of FIG. 1 are directly and easily scalable by merely connecting any node to multiple ports of switch 104.

If the estimated data rate of the selected interchange formal exceeds the bandwidth of switch 104 that is available for the audiovisual data stream, processing transfers to step 814. In step 814, stream manager 102 adjusts the constituent characteristics of the selected interchange format to reduce the bandwidth required by the selected interchange format. In one embodiment, stream manager 102 reduces the frame rate of the selected interchange format by one-half to reduce the estimated data rate of the selected interchange format. Of course, much more complex mechanisms can be used to reduce the data rate of the selected interchange format. In an alternative embodiment, data rate reduction is accomplished according to a predetermined default policy that can be specified according to the particular preferences of a given implementation. For example, image clarity may be paramount for a particular implementation and the default policy can prefer frame rate reduction over resolution reduction and lossy compression. In another implementation, smoothness of motion video may be paramount and the default policy can prefer resolution reduction and/or lossy compression over frame rate reduction. Other data rate reduction techniques can use lossless compression (e.g., run-length encoding) and frame-to-frame redundancy avoidance to reduce the data rate of the video interchange format without reducing quality of the transmitted audiovisual signal and without requiring particularly sophisticated logic in cither capture node 106A or display node 108A.

If, in test step 812, stream manager 102 determines that the estimated bit-rate does not exceed the available bandwidth through switch 104, step 814 is skipped since bit-rate reduction is unnecessary. After steps 812-814, processing by stream manager 102 according to logic flow diagram 706, and therefore step 706 (FIG. 7) completes.

Thus, in step 706, stream manager 102 selects an interchange format that is mutually supported by all involved nodes and that maximizes quality of the displayed audiovisual signal and that avoids unnecessary use of, or exceeding, available bandwidth through switch 104. In step 708, stream manager 102 establishes the video data stream from capture node 106A to display nodes 108A-D.

In this illustrative embodiment, stream manager 102 causes data rate reduction techniques to be applied equally to all portions of the same video signal. Accordingly, all portions of a video signal displayed in a window spanning multiple display monitors have a uniform appearance to a viewer. In an alternative embodiment, stream manager 102 causes data rate reduction techniques to be applied only as needed and allows different portions of the same video signal to have different applied data rate reduction techniques. This approach maximizes video signal quality of the various portions at the risk of a slightly different appearance between the various portions of the video signal corresponding to different display monitors.

In some instances, stream manager 102 is not able to effectively predict the data rate of a video signal after application of data rate reduction techniques. Such is particularly true if the amount of data rate reduction actually achieved depends upon the substantive content of the video signal, e.g., in such data rate reduction techniques as intra- and inter-frame redundancy avoidance as well as lossy and lossless compression, Accordingly, stream manager 102 can authorize capture node 106A to apply data rate reduction techniques on its own initiative within specified parameters. The parameters can include a maximum permissible data rate for the particular video signal and can include a policy which specifics preferences for various types of data rate reduction techniques. Stream manager 102 can communicate the authorization and the parameters to capture node 106A during initiation of the data stream representing the video signal.

Figure 16:
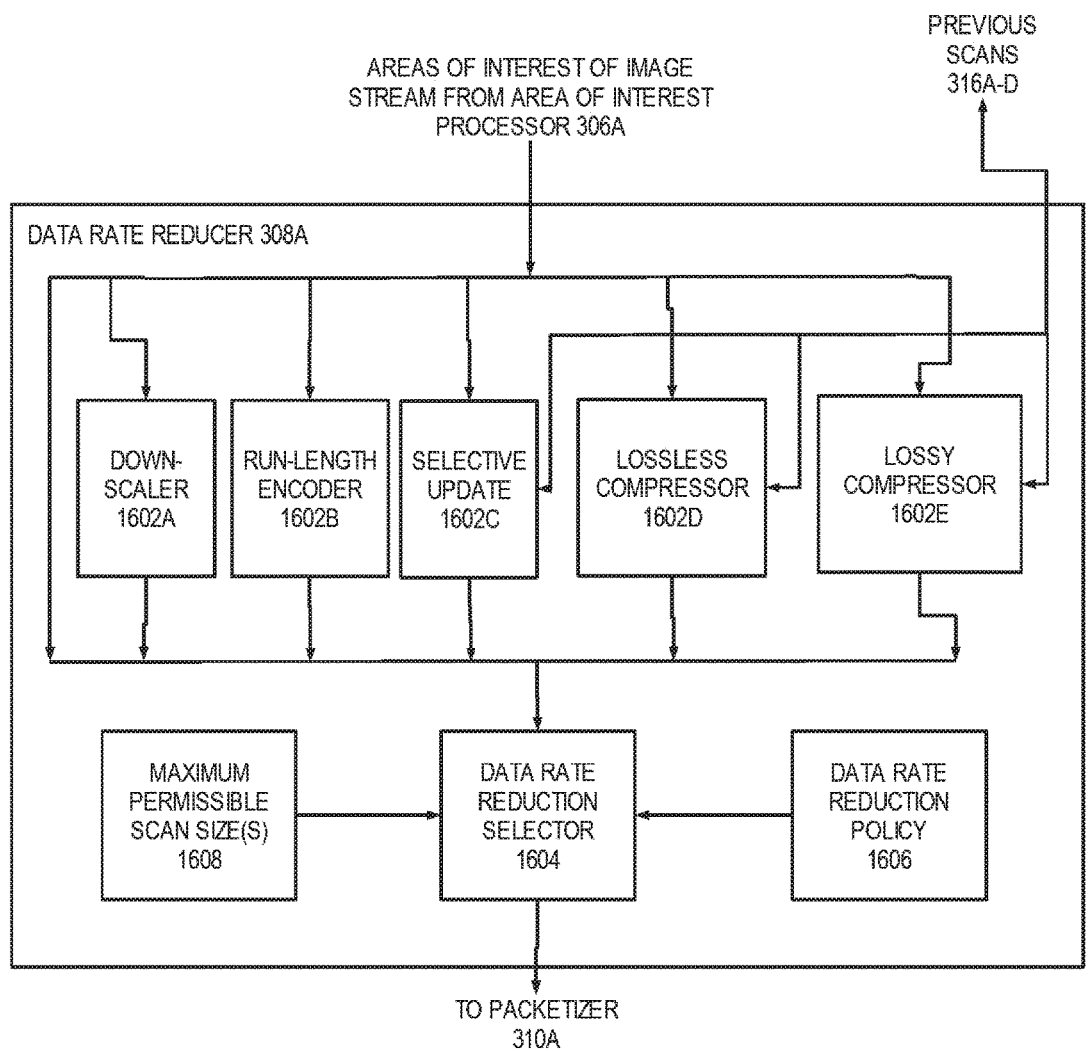
FIG. 16 is a block diagram showing the data rate reducer of FIG. 3 in greater detail.

To facilitate self-directed application of data rate reduction techniques by capture node 106A, data rate reducer 308A includes a number of data rate reduction modules 1602A-E as shown in FIG. 16. A data rate reduction technique selector 1604 selects a data rate reduction technique according to the results of data rate reduction modules 1602A-E, a data rate reduction policy 1606, and maximum permissible area of interest size(s) 1608.

To make this selection, data rate reducer 308A receives corresponding area of interest scans that collectively represent a frame of the video signal from area of interest processor 306A. Of course, when the entirety of a video stream is destined for a single display node and is fully visible, there will likely be only one area of interest, namely, the entire frame. Data rate reducer 308A stores tie scans in respective previous scans 316A-D and submits the scans to data rate reduction modules 1602A-E. Data rate reduction modules 1602A-E each apply a respective data rate reduction technique concurrently with the others of data rate reduction modules 1602A-E.

In this illustrative embodiment, (i) data rate reduction module 1602A applies frame size down-scaling to one-quarter size (half height and half width); (ii) data rate reduction module 1602B applies run-length encoding for intra-scan redundancy avoidance; (iii) data rate reduction module 1602C applies selective update encoding for inter-scan redundancy avoidance; (iv) data ate reduction module 1602D applies lossless compression; and (v) data rate reduction module 1602E applies lossy compression. Some data rate reduction modules, e.g., data rate reduction modules 1602C-E, require access to previous scans 316A-D to properly apply their respective data rate reduction techniques. It should be appreciated that different and more (or fewer) data rate reduction modules can be implemented by data rate reducer 308A, including modules implementing combinations of data rate reduction techniques.

Each of data rate reduction modules 1602A-E produces a data rate reduced scan of each respective area of interest is a candidate scan for consideration by data rate reduction technique selector 1604. Thus, for each area of interest scan submitted to data rate reduction modules 1602A-E, five (5) candidate scans representing the same area of interest with different data rate reduction techniques applied are produced. In this illustrative embodiment, each area of interest scan also bypasses data rate reduction modules 1602A-K such that each area of interest has a sixth candidate scan with no data rate reduction applied at all. For each area of interest, data rate reduction technique selector 1604 receives all six (6) candidate scans and selects one for submission to packetizer 310A. By selecting one of the candidate scans of an area of interest for submission to packetizer 310A and eventually for transportation to a display node, data rate reduction technique selection 1604 selects the particular data rate reduction techniques to be applied to each area of interest scan.

Data rate reduction policy 1606 implements a policy received from stream manager 102 in selecting one of the candidate scans for submission to packetizer 310A. Maximum permissible scan size(s) 1608 represents a constraint on the maximum data size of respective scans of the areas of interest that can be sent through switch 104 to respective display nodes.

The following example is helpful in understanding the manner in which a maximum permissible scan size is determined for each area of interest scan. Consider hypothetically that full bandwidth between capture node 106A and the destination display node is 1 gigabit per second and that overhead is estimated to be 10%, leaving 900 megabits per second for video signal payload. In this example, the captured video signal is allocated 100% of available bandwidth, i.e., the full 900 megabits. Consider further that the video signal captured by capture node 106A has a resolution of 1600.times.1200 with 24 bits of color per pixel and 60 frames per second. For simplicity in this example, the whole video signal is one whole area of interest and no part of the video signal is destined for a different display node. In one-sixtieth of a second, the maximum data capacity from capture node 106A to the destination display node is 15 megabits. The maximum permissible area of interest scan size generalizes to the total bandwidth available to the video signal in bits per second divided by the frame rate in frames per second to provide a maximum size of a scan of the area of interest in bits per scan.

If the respective sizes of the incoming scans of the respective areas of interest are no greater than the respective maximum permissible sizes, no data rate reduction techniques are required and data rate reducer 308A can by-pass data rate reduction modules 1602A-E altogether. In this example, a single frame of the captured video signal is 46 megabits of data, more than three times the maximum permissible frame size. Accordingly, some data rate reduction is required.

For a given area of interest, data rate reduction technique selector 1604 discards all candidate scans that exceed the maximum permissible scan size of the area of interest. Thus, any data rate reduction technique, including application of no data rate reduction at all, that results in an area of interest scan that exceeds the maximum permissible scan size is rejected by data rate reduction technique selection 1604. Of those candidate scans of the given area of interest that are not discarded and are therefore within the maximum permissible scan size, data rate reduction technique selector 1604 selects one candidate scan of the given area of interest according to data rate reduction policy 1606. Data rate reduction policy 1606 specifies respective relative priorities for data rate reduction modules 1602A-E and indicates which of data rate reduction modules 1602A-E are supported by the involved display nodes, i.e., apply data rate reduction techniques that can be reversed by the involved display nodes. Data rate reduction technique selector 1604 selects the candidate scan of the given area of interest from the data rate reduction module that has the highest relative priority from among alt data rate reduction modules supported by the involved display nodes. In other words, data rate reduction technique selector 1604 also discards all candidate scans of the given area of interest produced by data rate reduction modules not supported by the involved display nodes and selects the remaining candidate scan of the given area of interest with the highest relative priority.

In this illustrative embodiment, the highest priority is always the by-pass candidate scan of a given area of interest, i.e., the candidate scan for which no data rate reduction technique is applied. The involved display nodes always support application of no data rate reduction technique. Accordingly, data rate reduction is only applied when the incoming scan of a give area of interest exceeds the maximum permissible scan size the given area of interest. Generally, lossless techniques such as redundancy avoidance and lossless compression are preferred, and therefore have higher priority, to lossy techniques such as frame size downscaling and lossy compression.

Continuing in the example above, data rate reduction module 1602A performs frame size downscaling of the 1600.times.1200 frames to 800.times.600 frames, each of which is 11.5 megabits in size. Run-length encoding performed by data rate reduction module 1602B reduces data rate by an amount that depends on the substantive content of the area of interest scan and can produce data rate reductions of 1:1 (no reduction), 3:1, 5:1, or even 10:1. Selective updating (inter-scan redundancy avoidance) also reduces data rate by an amount that depends on the substantive content of the area of interest scan and can reduce data rate to near zero if the current scan is identical to the previous scan of the area of interest or not at all if the current scan is not at all the same as the previous scan.

By selecting the candidate scan according to data rate reduction policy 1606 and maximum permissible scan size(s) 1608, data rate reduction technique selector 1604 selects the data rate reduction technique producing the highest quality video signal that will not exceed the maximum permissible size. Having made the selection, data rate reduction technique selector 1604 passes the selected candidate scan to packetizer 310A along with data identifying the particular data rate reduction technique(s) applied to the selected candidate scan such that the packets ultimately received by the display nodes include sufficient information to reverse the data rate reduction techniques.

In this illustrative embodiment, data rate reducer 308A processes individual areas of interest of the subject video signal independently of one another. In particular, data rate reduction technique select 1604 selects from candidate scans of each area of interest independently of all other areas of interest of the same video signal. Accordingly, each area of interest of each frame can have a different data rate reduction technique applied. For example, in various areas of interest of a given frame of a video signal, one area of interest can require lossless compression while a second area of interest can be best transported with selective updating, a third area of interest can be best transported with run-length encoding, and a fourth area of interest can be transported with no data rate reduction at all.

In an alternative embodiment, data rate reduction technique selector 1604 ensures that the same data rate reduction techniques are applied to all areas of interest of a given frame. For example, data rate reduction technique selector 1604 discards alt candidate frames of which at least one constituent area of interest scan exceeds the corresponding maximum permissible scan size. In other words, if a particular data rate reduction technique cannot be applied to any area of interest of a given frame (e.g., for exceeding the maximum permissible scan size for that area of interest), that particular data rate reduction technique is not applied to any other area of interest of the given frame. In this alternative embodiment, data rate reduction technique selector 1604 selects indicates scans for all areas of interest of a given frame from the same one of data rate reduction modules 1602A-E.

In another alternative embodiment, data rate reducer 308A selects data rate reduction techniques for scanlines rather than for the area of interest as a whole. In other words, each scanline of an area of interest scan is considered independently when selecting a data rate reduction technique.

Figure 9:
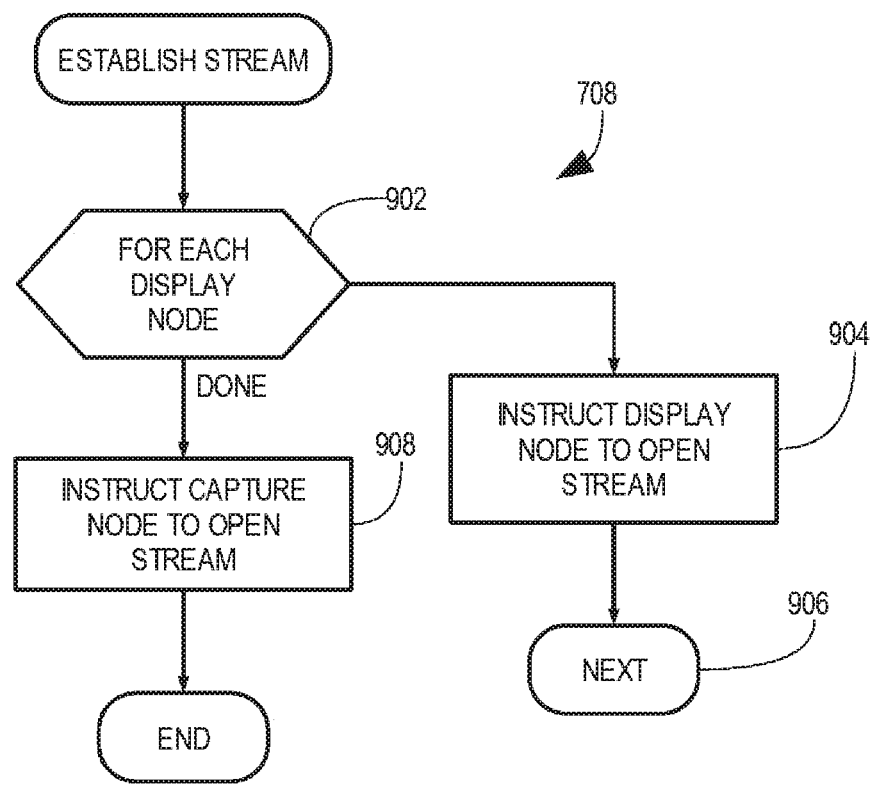
FIG. 9 is a logic flow diagram of the initiation of delivery of the video stream by the stream manager.

3. Establishing the Video Data Stream from a Capture Node to One or More Display Nodes Step 708 is shown in greater detail as logic flow diagram 708 (FIG. 9), Loop step 902 and next step 906 define a loop in which stream manager 102 processes each of the involved display nodes according to step 901. In step 904, stream manager 102 requests that the subject display node open a video stream. The request identifies the involved capture node from which the video stream should be received and specifics the interchange format of the video stream. The request can be sent as a single data packet or as multiple data packets. Tor example, one data packet can identify the involved capture node, one or more other data packets can each specify one or more properties of the interchange format, and a last data packet can instruct the display node to expect and process the subject stream in accordance with the earlier data packets. In addition, the request specifies a location within the respective display monitor the video component of the audiovisual stream is to be displayed. Once stream manager 102 performs step 904 for all involved display nodes, processing according to the loop of steps 904-906 completes.

In step 908, stream manager 102 sends a request to the invoked capture node, e.g., capture node 106A in this illustrative example, to open a video stream. The request specifies both the interchange format for the subject video stream and one or more display nodes to which the subject video stream is to be sent. As described above with respect to step 904, the request can be a single packet or multiple packets. In this embodiment, the request—whether in one or multiple packets—specifies which parts of the video stream are to be sent to which recipient display nodes. In addition, the request can authorize capture node 106A to apply data rate reduction techniques at will and can specify parameters of such data rate reduction techniques as described more completely below. Since window 204A occupies all of display monitors 202A-D, each of display nodes 108A-D receives at least part of the video stream associated with window 204A.

After step 908, processing according to logic flow diagram 708, and therefore step 708 (FIG. 7), completes. After step 708, processing by stream manager 102 according to logic flow diagram 700 completes. Once the video stream is initiated between the involved capture node and the involved display node(s), the involved nodes cooperate with one another through switch 104 without requiring direct involvement by stream manager 102. Stream manager 102 stops the video stream in a directly analogous manner, requesting that the involved capture and display nodes terminate the previously initiated stream. Stream manager 102 stops the video stream in response to signals received from user interface 110 representing a user's request to stop display of the video stream in window 204 A, e.g., in response to closing of window 204A by the user. If user interface 110 sends signals representing a change in the display of window 204A to stream manager 102, e.g., in response to a moving or resizing of windows 204A, stream manager 102 stops the video stream and then subsequently re-starts the audiovisual stream in the manner described above with the respective locations in the involved display node(s) updated to reflect the new display location of window 204A.

In response to the request from stream manager 102 sent in step 908, capture node 106A initiates sending of the video stream in a manner described above with respect to FIG. 3. In response to the request from stream manager 102 sent in step 904, each of the involved display nodes, e.g., display node 108A, receives and processes the video stream in a manner described above with respect to FIG. 4.

Capture node 106A and display node 108A cooperate to transport a video stream through switch 104 without requiring direct involvement of stream manager 102. In short, the video stream simply runs from capture node 106A to display node 108A at up to the full bandwidth of port-to-port connections through switch 104. With the current availability of one-gigabit network switches, high quality video streams can be routed through switch 104 from as many capture nodes and to as many display nodes as can be coupled to switch 104.

4. Synchronization of Monitors in a Display Wall

As shown in FIGS. 1 and 2, display monitors 202A-D are arranged in a tiled fashion to provide a display wall 200 (FIG. 2) as shown. One of the difficulties of display walls is that constituent display monitors each have their own independent display timing generator and, accordingly, refresh asynchronously with respect to one another. Such asynchronous refreshing of display monitors in a display wall can cause some displeasing visual artifacts, an example of which is referred to as "frame tearing." A conventional approach to synchronization of multiple display monitors is commonly referred to as "genlock" in which all display monitors to be synchronized receive a hard-wired signal representing vertical and horizontal synchronization signals. This genlock technique is well-known in the broadcast industry.

Genlock provides very tight synchronization, e.g., within a few nanoseconds. However, genlock requires coordination of hard-wired signals and limits flexibility otherwise provided by the video distribution system described herein. In addition, frame tearing can be avoided with less tightly coupled synchronization between display monitors of a display wall. If display monitors 202A-D are synchronized to within a few tens of microseconds, no frame tearing should be visible. Accordingly, a more flexible synchronization mechanism is used in the video distribution system of FIG. 1 to avoid visual artifacts such as frame tearing without requiring hard-wired synchronization.

To synchronize all display nodes, stream manager 102 periodically broadcasts a timing synchronization packet. Ordinarily, broadening a timing synchronization packet would not be an effective synchronization mechanism since Baffle within the network can vary the arrival time of the timing synchronization packet at various destinations in unpredictable ways. However, a few characteristics of the video distribution system described herein enables effective use of lining synch ionization packets for synchronization of display monitors 202A-D.

Figure 14:
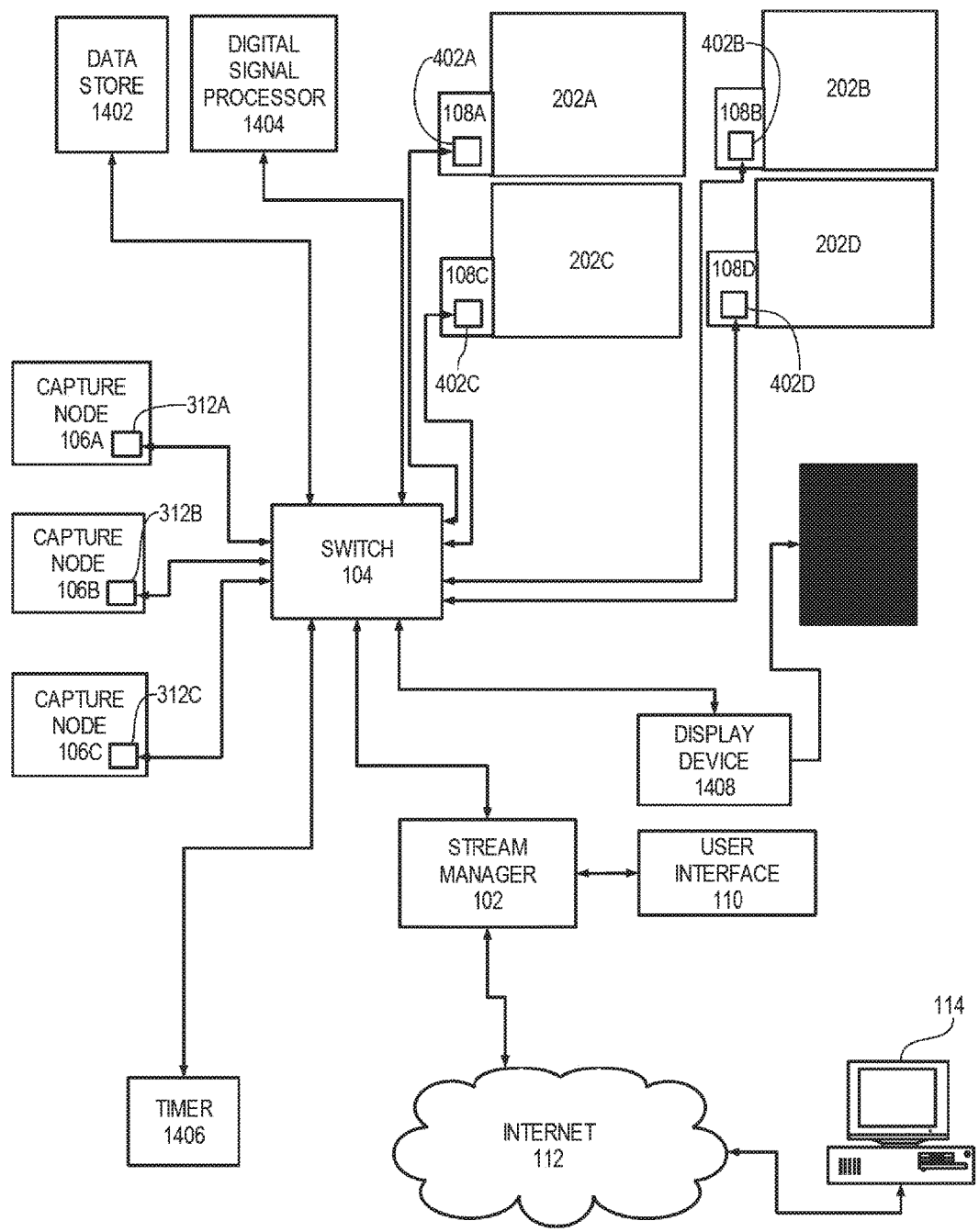
FIG. 14 is a block diagram showing a video stream distribution system in accordance with the present invention containing additional features relative to the video stream distribution system of FIG. 1.

First, the network shown in FIG. 1 is closed, meaning that stream manager 102, capture nodes 106A-C, and display nodes 108A-D account for nearly all traffic through switch 104. As shown in FIG. 14, other nodes can send data through switch 104; however, all the nodes attached to switch 104 are components of the video distribution system described herein.

Second, all components of the video distribution system can predict, with a fair degree of accuracy, when the next liming synchronization packet is to be sent by stream manager 102. To enable such prediction, stream manager 102 sends the timing synchronization packet at a regular interval, e.g., once per second, and this regular interval is known by all components of the video distribution system, e.g., by manual programming of the node or by notification during the registration process described above. In addition, each component, e.g., each of capture nodes 106A-C, includes an internal clock that is sufficiently accurate to determine when the stream manager 102 is about to send a timing synchronization packet.

To avoid unpredictable delay in propagation of the timing synchronization packet through switch 104, all nodes, especially capture nodes 106A-C, voluntarily stop transmitting data for a predetermined period of time prior to expected transmission of the next timing synchronization packet. The predetermined period of time is selected such that all previously transmitted data has time to travel through switch 104 to respective destination nodes, e.g., display nodes 108A-D, and depends upon the particular topology of the network through which video signals are distributed. In this illustrative embodiment, the predetermined period of time is 15 microseconds. In embodiments with multiple switches and/or particularly large packet sizes, the predetermined period of time can be 100 microseconds.

During this predetermined period of time, no new data is being transmitted through switch 104 and all data currently stored in buffers within switch 104 is allowed to make its way to its various destination nodes. Thus, when stream manager 102 broadcasts the next timing synchronization packet, the buffers of switch 104 are empty and no traffic interferes with propagation of the timing synchronization packet to display nodes 108A-D. Accordingly, the timing synchronization packet propagates through the network with fixed delays, thereby enabling effective synchronization of display nodes 108A-D to within a few tens of microseconds. Once the timing synchronization packet is received, all nodes can resume transmission of data until a short time before the next synchronization packet is expected.

In this illustrative embodiment in which stream manager 102 sends a timing synchronization packet once per second, the overhead imposed by the cessation of transmission immediately prior to receipt of the timing synchronization packet is less than 0.1%. If stream manager 102 sends a timing synchronization packet much more frequently, e.g., once per video frame, the overhead is still less than 2%. In addition, while it is described that stream manager 102 periodically sends the timing synchronization packet, it should be appreciated that another node, such as capture node 106A or a timer node 1406 (FIG. 14) can periodically send the timing synchronization packet. All that is needed for accurate synchronization in the manner described herein is that capture node 106A can predict the time of each timing synchronization packet with sufficient accuracy to suspend transmission aid allow clearing of the data path ahead of the timing synchronization packet.

5. Per-Stream Frame Synchronization Across Multiple Display Nodes

Synchronizing display monitors in a display wall as described above is not always sufficient to avoid undesirable visual artifacts such as frame tearing. Consider that, at the time of a frame refresh of display monitors 202A-D, display nodes 108A-B (FIG. 1) have completely received their respective portions of the video stream of window 204A (FIG. 2) but display nodes 108C-D have not. Display monitors 202A-B could display their respective portions of the newly received frame while display monitors 202C-D can display their respective portions of a prior and previously received frame. Such would result in frame tearing at the horizontal boundary between the tiled display monitors.

When network controller 312A (FIG. 3) determines that the entirety of all scans of constituent areas of interest of a particular frame has been sent through switch 104 and before network controller 312A begins to process the next frame of the subject video stream, network controller 312A sends a frame synchronization packet to all display nodes to which an area of interest of the particular frame have been sent. The frame synchronization packet can be a simulated vertical synchronization signal, except that the frame synchronization packet identifies a specific frame of the video signal and is sent by network controller 312A separately from pixel data to all display nodes receiving at least a portion of the video signal at about the same time, e.g., as a multicast packet. Sending the frame synchronization packet separately from pixel data ensures a relatively small packet that is less likely to arrive at the various display nodes at significantly different times.

The frame synchronization packet is received by alt involved display nodes. In this embodiment in which frame display is synchronized among multiple display nodes and as incorporated by reference above with respect to video compositor 410A, the writing of pixels by video compositor 410A is to a temporary buffer and not directly to a frame buffer. The display node, e.g., display node 108A, copies that portion of the temporary buffer to the frame buffer upon receipt of the frame synchronization packet. In this illustrative embodiment, the received frame synchronization packet is processed as a vertical synchronization signal, thus effecting very quick transfer of the received pixel data to a frame buffer of display node 108A. Capture node 106A sends the frame synchronization packet to all involved display nodes al about the same time, and components 402A-408A of display node 108A pass the frame synchronization packet straight through to video compositor 410A for quick and immediate processing. Thus, nearly contemporaneously, all display nodes involved in the display of the subject video stream write their respective portions to their respective frame buffers. Such prevents frame tearing at boundaries between display monitors.

6. Congestion Avoidance

While stream manager 102 limits the bandwidth available to each video data stream sent by the capture nodes, a concern is that simultaneous bursts from more than one of the capture nodes can overflow an outbound buffer in the port of switch 104 connected to display node 108C so as to cause loss of pixel data. Accordingly, congestion avoidance improves performance of the video distribution system described herein.

In one embodiment, capture nodes and display nodes cooperatively implement a metered approach to avoid congestion. In this metered approach, each of capture nodes 106A-C is configured to meter transmission of data through switch 104 to avoid such bursts. Since the capture nodes meter their own respective transmission rates, this approach follows a push paradigm.

In another embodiment, capture nodes and display nodes cooperatively implement a burst approach to avoid congestion. In the burst mode described more completely below, display nodes request video data to be sent at full data rate from each capture node in turn in a pull paradigm.

In a third embodiment, capture nodes and display nodes cooperatively implement a hybrid "metered burst" approach which uses both the metered and burst approaches. This metered burst congestion avoidance approach is described more completely below.

In the metered approach, the metering of data transmission is controlled, at least in pan, according to a smallest buffer size encountered en route from a given capture node to the destination display node, and the size of this smallest buffer is sometimes referred to as a minimum buffer size for the corresponding display node. Determining the minimum buffer size requires some information regarding the topology of the network through which audiovisual data streams pass in various selected interchange formats. In one embodiment, a minimum butter size can be directly and manually programmed into each capture node. For example, a number of jumpers can be made user-accessible and various combinations of jumper locations can select a nearest minimum buffer size. Alternatively, capture nodes 106A-C can include embedded web servers and implement an SNMP configuration tool to allow user specification of the minimum buffer size. However, in this illustrative embodiment, capture nodes 106A-C are agnostic with respect to the topology of the network to which they are connected and receive information regarding the minimum buffer size associated with each respective one of display nodes 108A-D from stream manager 102. Stream manager 102 can be programmed with data representing the overall topology of the network interconnecting capture nodes 106A-C and display nodes 108A-D and the butter sizes of respective switches, e.g., switch 104, such that stream manager 102 can determine the smallest buffer size that will be encountered in the paths from capture nodes 106A-C to any of display nodes 108A-D.

Bandwidth allocated to each of the capture nodes for delivering data streams to a particular display node is limited in that their summed bandwidth must be no greater than the total bandwidth available to the display node. Briefly stated, the metering by each of capture nodes 106A-C means that, for a time interval determined according to the minimum buffer size, each capture node maintains a ratio of transmit time to idle time where the ratio is related to the allocated bandwidth of the capture node. To facilitate understanding and appreciation of this point, the illustrative example of display node 108C, driving display monitor 202C (FIG. 2) of display wall 200, is described. Display node 108C receives a portion of the video signal of window 204A from capture node 106A, the entirety of the video signal of window 204B from capture node 106B, and a portion of the video signal of window 204C from capture node 106C.

In this illustrative example, stream manager 102 has allocated 30% of the available bandwidth received by display node 108C to capture node 106A. Thus, in the maximum time interval, capture node 106A maintains a ratio of 30% transmit time to 70% idle time with respect to display node 108C. During this idle time, capture node 106A can send data streams to other display nodes. Similarly, capture nodes 106B-C maintain respective ratios of (i) 60% transmit time to 40% idle time and (ii) 10% transmit time to 90% idle time. As a result, the outbound buffer of switch 104 to display node 108C is never overwhelmed by simultaneous bursts from two or more of capture nodes 106A-C.

The time interval is the amount of time the smallest buffer in the path from capture node 106A to display node 106C can be filled at the connection data rate. In this illustrative embodiment, the smallest buffer is 16 kB and the connection data rate is 1 Gb/s. Thus, the time interval is 128 microseconds. To maintain the proper ratio, capture node 106A transmits to display node 108C no more than 30% of any 128-microseeond interval to maintain a ratio of 30% transmit time to 70% idle time with respect to the video data stream transmitted to display node 108C. That results in generally 38 microseconds of transmit time and 90 microseconds during which transmission from capture node 106A to display node 108C is suspended during any 128-microsecond interval. It should be noted that the idle time of capture node 106A with respect to display node 108C pertains only to display node 108C; capture node 106A is free to continue transmission of other audiovisual data streams to other display nodes during that idle time.

In metering audiovisual stream transmission in this manner, capture nodes 106A-C avoid exceeding the available bandwidth to display node 108C, even for short bursts which might overflow buffers in display node 108C or in intermediate network devices between capture nodes 106A-C and display node 108C.

In the burst approach, the display node selects one of a number of capture nodes to send video data at full data rate. In the same example involving display node 108C, display node 108C sends a packet to only one of capture nodes 106A-C authorizing the capture node to send a data stream at full data rate. While one capture node sends a data stream to display node 108C, other capture nodes are idle with respect to display node 108C but can send data streams to other display nodes. To change sending authorization from one capture node to another, display node 108C sends a slop packet to the previously authorized capture node and sends an authorization packet to a new capture node.

In this example, display node 108C can authorize capture node 106A to send a data stream at full data rate for a predetermined duration or until a complete frame of a portion has been received by display node 108C. Then, display node 108C can send a stop packet to capture node 106A and authorize capture node 106B to send a data stream at full data rate for a predetermined duration or until the current frame of the portion has been received by display node 108C. Capture node 108C can do the same with respect to capture node 106C.

Figure 11:
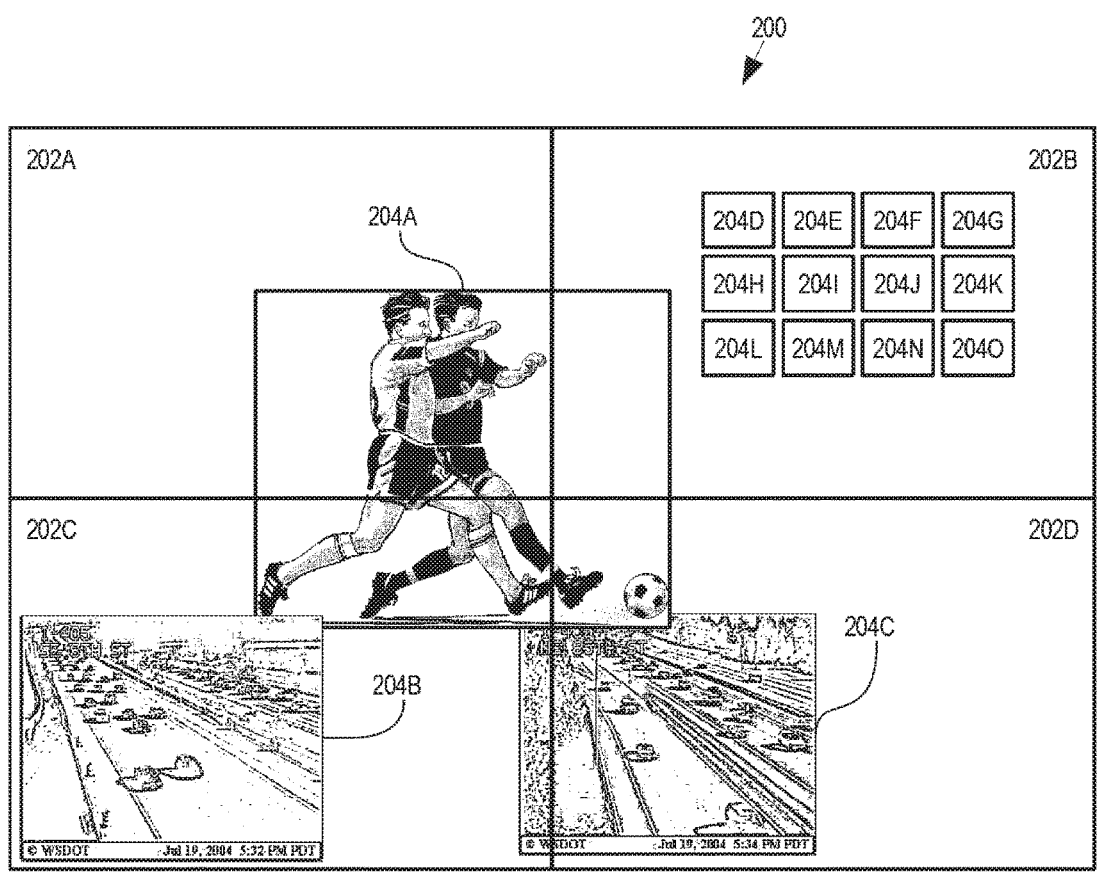
FIG. 11 is an illustration of a display wall to show video streams as displayed in accordance with the present invention.

Both the metered approach and the burst approach have difficulties in specific circumstances. For example, if a display node receives many small video signals from many capture nodes, the metered approach allocates to each capture node a very small portion of the available bandwidth to the display node. This situation is illustrated in FIG. 11. In addition to a portion of window 204A, display monitor 202B also includes small windows 204D-O, each of which can show a reduced-size version of a video signal received from respective capture nodes (not shown). In this illustrative example, stream manager 102 can allocate 40% of available bandwidth to the portion of window 204A displayed by display node 108B and 5% of available bandwidth to each of windows 204D-O, i.e., 60% to windows 204D-O collectively. Thus, in the metered approach, the respective capture node for each of windows 204D-O would transmit packets 5% of relatively short periods of time and remain idle with respect to display node 108B 95% of the relatively short periods of time. Accordingly, packet sizes can gel quite small, leading to relatively high overhead in the form of packet headers and the requisite processing of those packet headers by depacketizer 404A, for example.

The burst approach requires coordination between display nodes. For example, if display node 108B authorizes capture node 106A to send a data stream representing the video of window 204A at full data rate and capture node 106A complies, capture node 106A cannot simultaneously send a data stream representing another portion of the video of window 204A to a different display node, e.g., display node 108A. In a small display wall with relatively few display nodes, such coordination such that full data rate to all display nodes is fully utilized may be reasonably feasible. However, as the number of display nodes in a display wall increase and the number of capture nodes driving the display wall increase, the coordination effort grows substantially and can easily become impractical.

Figure 10:
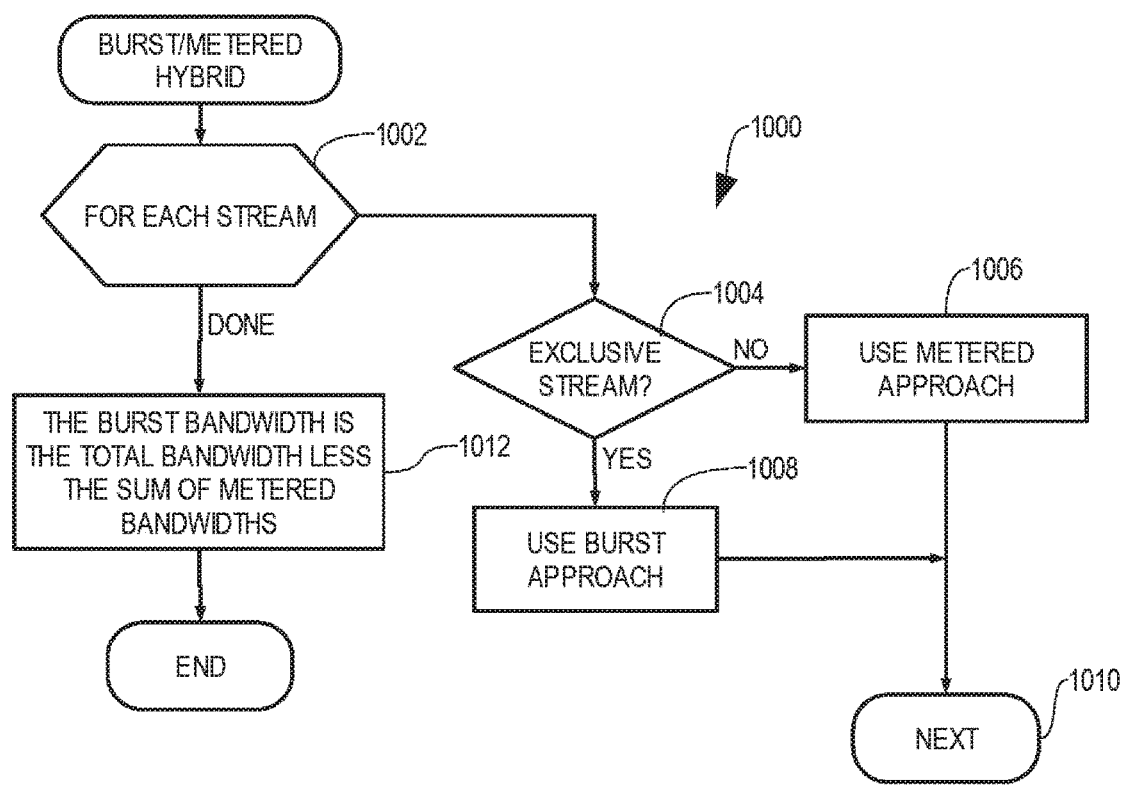
FIG. 10 is a logic flow diagram showing congestion avoidance in a metered burst approach.

In the third embodiment, stream manager 102 implements the metered burst approach to avoid congestion as illustrated by logic flow diagram 1000 (FIG. 10). Before processing according to logic flow diagram 1000, stream manager 102 is presumed to have already determined what share of the total available bandwidth is allocated to each of the data streams received by a particular display node. Logic flow diagram 1000 illustrates the process by which stream manager 102 informs the display node as to the particular manner in which such allocations are to be enforced.

Loop step 1002 and nest step 1010 define a loop in which stream manager 102 processes all data streams received by a particular display node, e.g., display node 108B in this illustrative example, accordingly to steps 1004-1008. For each iteration of the loop of steps 1002-1010, the particular data stream processed by stream manager 102 is sometimes referred to as the subject data stream.

In test step 1004, stream manager 102 determines whether the subject data stream is exclusive, i.e., whether the subject data stream represents the entirety of a video signal and no other portions of the video signal are received by any other display nodes. If the subject data stream is not exclusive, processing transfers to step 1006 and stream manager 102 sends data to display node 108B instructing display node 108B to use the metered approach described above with respect to the subject stream and informing display node 108B of the allocated share of bandwidth for the subject data stream. Such data can be included in the request of step 904 (FIG. 9) described above. By using the metered approach with non-exclusive data streams, no coordination is required between multiple display nodes receiving data streams from the same capture node.

Conversely, if stream manager 102 determines in test step 1004 (FIG. 10) that the subject data stream to display node 108B is exclusive, processing transfers to step 1008. In step 1008, stream manager 102 determines that a metered burst approach should be implemented by display node 108B.

However, stream manager 102 postpones informing display node 108B of the use of the metered burst mode until the relative bandwidth allocation for the metered burst mode has been determined in step 1012 below.

After step 1006 or step 1008. processing by stream manager 102 transfers through next step 1010 to loop step 1002 in which stream manager 102 processes the next data stream received by display node 108B according to steps 1004-1008. When stream manager 102 has processed all data streams received by display node 108B according to the loop of steps 1002-1010, processing transfers from loop step 1002 to step 1012.

In step 1012, stream manager 102 determines the burst bandwidth. The burst bandwidth is the total available bandwidth en route to display node 108B less any allocated bandwidth using the metered approach. Alternatively, the burst bandwidth is the sum of the allocated bandwidth for the data streams for which the metered burst approach is to be used. In either case, in this illustrative embodiment, the burst bandwidth is 60% since display node 108B uses the metered approach for window 204A (allocated 40%) and the metered burst approach for windows 204D-O (allocated 5% each, 60% collectively). Stream manager 102 instructs display node 108B to use the metered burst approach for the applicable data streams as determined in step 1008 and communicates the burst bandwidth. Such instruction can be included in the request sent in step 904 (FIG. 9) as described above.

In the metered burst approach, display node 108B uses the pull paradigm described above with respect to the burst approach but also includes data representing a bandwidth allocation in the instructions to start sending data. Capture nodes respond by starting transmission that is metered in the manner described above with respect to the metered approach to no more than the burst bandwidth. Since display node 108B uses the metered approach with respect to the area of interest of window 204A, display node 108B instructs capture node 106A to send video data metered at 40%, the allocated bandwidth for window 204A with respect to display node 108B. Display node 108B does not instruct capture node 106A to stop vending video data for the duration of the display of window 204A.

With respect to windows 204D-O for which display node 108B uses the metered burst approach, display node 108B authorizes one associated capture node at a time to send data metered at the burst bandwidth, e.g., 60%. Thus, display node 108B receives video data for only one of windows 204D-O at a time but, in bursts of up to 60% of the total available bandwidth received by display node 108B. Accordingly, video data for windows 204D-O can be received in relatively large packets, thereby avoiding the inefficiencies associated with small packets.

E. System Performance Regulation by Stream Manager 102

Thus, an audiovisual signal in a native format is captured by capture node 106A into a native interchange format, transported through switch 104 to one or more of display nodes 108A-D in a selected interchange format, and converted from a displayable interchange format by the involved display nodes to a displayable format for display in one or more of display monitors 202A-D. Since the audiovisual signal is convened to a digital, packetized formal for transport through switch 104, format conversion is supported by both capture nodes and display nodes. As a result, the native format and the displayable format can be different from one another and conversion from the native format to the displayable format is almost incidental. In fact, the entire system can be completely heterogeneous. Each of capture nodes 106A-C can capture audiovisual signals in different native formats, and—while such is unlikely in any individual display wall—display nodes 108A-D can drive respective displays requiring different displayable formats. In fact, the video distribution system described herein supports display of a single audiovisual signal across tiled display monitors requiring different respective displayable formats. However, it is appreciated that most display walls will include homogeneous display monitors to enhance the user's perception of the display wail as a single, integrated display.

Another advantage of the system of FIG. 1 is that stream manager 102 configures and initiates transportation of audiovisual data streams through switch 104 and thereafter allows capture nodes and display nodes to cooperate directly to transport such signals through switch 104 without ongoing intervention by stream manager 102. Therefore, stream manager 102 does not represent a limitation on the throughput of audiovisual streams through switch 104. Instead, audiovisual streams can move through switch 104 at nearly the full connection speed. Accordingly, many more audiovisual streams can be transported from capture nodes 106A-C to display nodes 108A-D than can be transported in conventional bus-oriented architectures.

It should be appreciated that, while display monitors 202A-D are shown to be arranged in a tiled display and are the only display monitors connected to switch 104, other devices which are not part of the same tiled display can be connected to switch 104. In addition, switch 104 can be multiple inter-connected switches.

The system of FIG. 1 can support multiple, distinct display walls and other independent display devices. The interaction of capture nodes with multiple independent display nodes is described more completely in the parent U.S. patent application Ser. No. 11/111,182 and that description is incorporated herein by reference in its entirety. One significant consequence is that, while capture node 106A captures a single audiovisual signal, capture node 106A can send multiple versions of the captured audiovisual signal to multiple respective display nodes, each of the versions in its respective interchange format.

1. Multiple Outgoing Streams from a Single Capture Node

It is possible that such multiple versions of the captured audiovisual signal in the respective interchange formats can exceed the available bandwidth from capture node 106A to switch 104. Stream manager 102, in combination with user interface 110. provides a mechanism by which a human user can weigh the various tradeoffs involved in reducing bandwidth for one or more of the versions of the audiovisual signal sent by capture node 106A. For example, user interface 110 provides a graphical user interface by which the user can specify that a particular version of the audiovisual signal can have a reduced frame rate to preserve image clarity or that signal fidelity of one version of the audiovisual signal is to be preserved at the expense of significant signal fidelity loss in another version of the audiovisual signal. The role of stream manager 102 as a centralized controller of audiovisual signal data streams through switch 104 in combination with user interface 110 allows a user the opportunity to control some of the choices made by stream manager 102.

Stream manager 102 selects interchange formats and can cause application of data rate reduction techniques to specify video and/or audio data streams which collectively remain within the available outbound bandwidth of a given capture node. In one embodiment, stream manager 102 allocates a percentage of such outbound bandwidth to each outgoing data stream, e.g., according to overall size (frame size and/or frame rate) of the content of the data stream, relative priority (e.g., window priority within a display), and/or relative desired quality. For example, stream manager 102 can allocate 92% of the outbound bandwidth of capture node 106A to the video data streams for window 204A (FIG. 2) and 8% for a highly reduced video signal to be sent to computer 114 (FIG. 1) for remote monitoring, which is described below. It should be noted that allocation of outbound bandwidth is not necessary for individual portions destined for different ones of display node 108A-D since metered congestion avoidance resolves any outbound bandwidth problems.

Once stream manager 102 has allocated a share of outbound bandwidth to a data stream, stream manager 102 selects an interchange format, and perhaps data rate reduction techniques, to produce an estimated data rate within the allocated share. Thus, each data stream is configured to fit within its allocated share of the outbound bandwidth.

Alternatively, stream manager 102 selects interchange formats for the respective data streams, and can cause application of data rate reduction techniques to each data stream, in such a manner that the aggregate estimated data rate is within the limits of the outbound bandwidth.

2. Multiple Incoming Streams to a Single Display Node

As shown in FIG. 2, three different capture nodes are sending video data to display monitor 202C, through display node 108C. Accordingly, three ports of switch 104, which are connected to respective capture nodes, send video data to a single port of switch 104 connected to display node 108C. Since stream manager 102 participates in the initiation of each audiovisual stream transported through switch 104, stream manager 102 is aware that not all three capture nodes can transmit at full bandwidth to the same display node as such would exceed the available inbound bandwidth of display node 108C. Under the control of user interface 110 in the manner described above, stream manager 102 allocates portions of the available inbound bandwidth of display node 108C to each of capture nodes 106A-C. For example, stream manager 102 can allocate 30% of the available inbound bandwidth of capture rode 106A to deliver the lower left portion of window 204A (FIG. 2); 60% to capture node 106B to deliver the entirety of window 204B; and 10% to capture node 106C to deliver the left portion of window 204C.

This allocation by stream manager 102 is possible because (i) stream manager 102 controls, in response to user interface 110, the location of windows 204A-G and therefore knows what proportion of each video signal is to be received by each display node and (n) stream manager 102 receives, through user interface 110, information regarding user preferences with respect to relative priorities of different video signals and what aspects of each video signal are more valuable than others (e.g., image clarity vs. smooth motion). Once stream manager 102 allocates the inbound bandwidth of display node 108C, stream manager 102 prevents congestion inbound to display node 108C using congestion avoidance techniques such as those described above.

3. Reallocating Bandwidth for Adding a New Video Stream

As described above, user interface 110 (FIG. 1) allows a user to specify which video signals are to be displayed in which locations within display wall 200 (FIG. 2). The user can open a new window to add a displayed video signal to display wall 200 or close a window, e.g., window 204C, to remove a displayed video signal from display wall 200. In addition, the user can move and/or resize a window to alter the display size and/or location of a displayed video signal within display wall 200. Each such change can overwhelm available bandwidth, outbound at one or more capture nodes or inbound at one or more display nodes or both.

Figure 12:
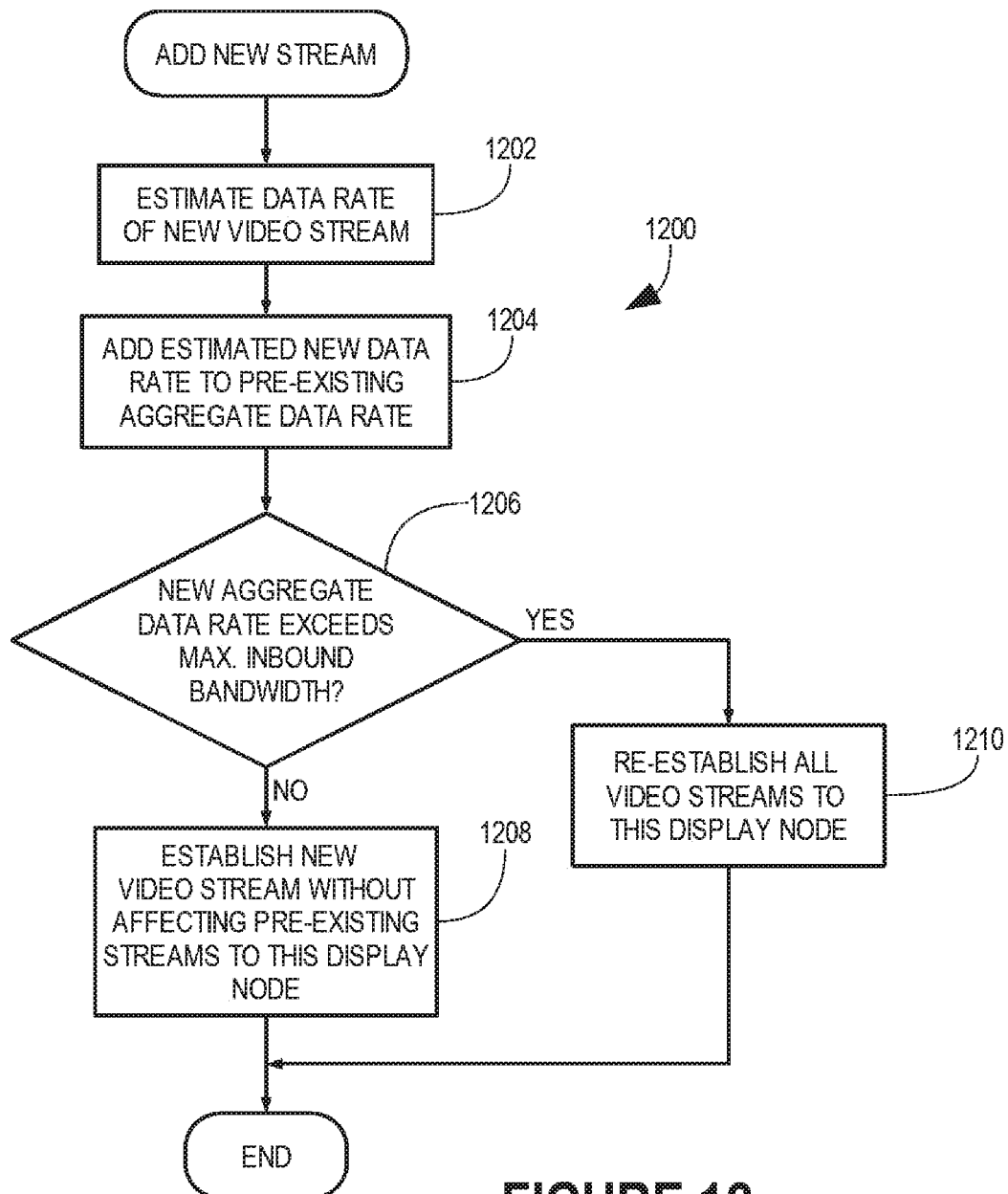
FIG. 12 is a logic flow diagram illustrating the addition of a video stream to other pre-existing video streams destined for a particular display node in accordance with the present invention.
Figure 15:
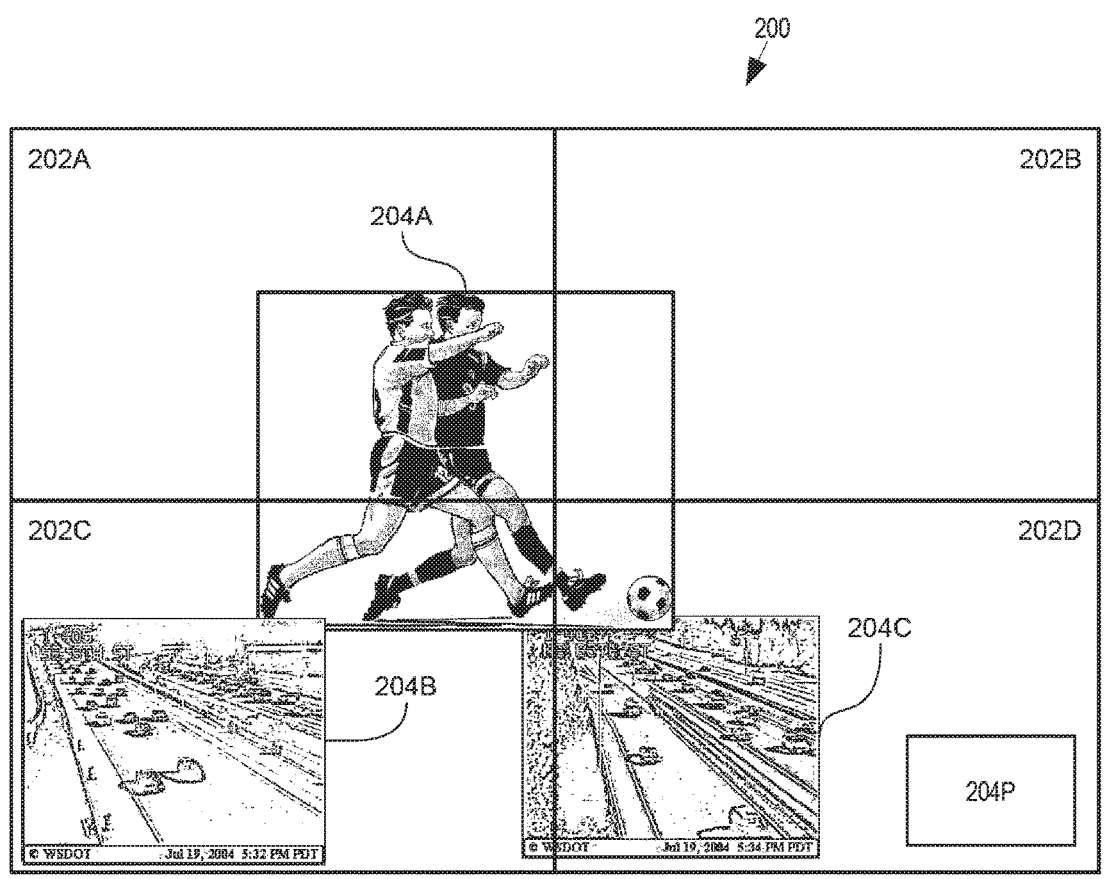
FIG. 15 is an illustration of a display wall to show video streams as displayed in accordance with the present invention.

FIG. 12 illustrates a change to the state of display wall 200. In particular, a new window 204P (FIG. 15) is to be displayed by display monitor 202D. For illustration purposes, consider that display by display monitor 202D of the portions of windows 204A and 204C viewable within display monitor 202D occupied all of the available inbound bandwidth (Figure of display node 108D prior to the change in state. Thus, insufficient bandwidth remains tor transportation of the video signal to be displayed in window 204P from switch 104 to display node 108D.

The general approach taken by stream manager 102 in adding a new video stream to those received by display node 108D is this; determine whether adding the new video stream will exceed bandwidth to display node 108D and, if so, adjust video streams to display node 108D so as to not exceed bandwidth thereto. This is illustrated in logic flow diagram 1200 (FIG. 12).

Since stream manager 102 configures and initiates streams between capture nodes 106A-C and display nodes 108A-D in the manner described above, stream manager 102 knows the parameters of all video streams transported therebetween. In some cases, stream manager 102 can accurately determine the data rate of a particular stream of video data. However, other Video streams, videos streams using redundancy avoidance and or lossy or lossless compression in particular, cannot be accurately predicted since the data rate depends to sonic degree on the substantive content of the video signal. To determine the data rate of these video streams, stream manager 102 periodically receives information regarding data rates of video streams from capture nodes 106A-C from each of capture nodes 106A-C, sent either automatically and periodically or in response to polls received from stream manager 102.

To determine whether the addition of a video stream for window 204P (FIG. 15) will exceed bandwidth to display node 108D, stream manager 102 estimates a data rate of that video stream in step 1202 (FIG. 12) and adds the estimated data rate to the data rates of the other video streams to display node 108D in step 1204 to determine an estimated aggregate data rate and compares the aggregate data rate to the available bandwidth to display node 108D in test step 1206. To estimate the data rate required for the video stream of window 204P, stream manager 102 selects an interchange format for the video stream in the manner described above.

If the estimated aggregate data rate is within the available bandwidth to display node 108D, no adjustment to any of the video streams is necessary and stream manager 102 initiates the video stream of window 204P in step 1208. Conversely, if the estimated aggregate data rate exceeds the available bandwidth to display node 108D, the video streams require adjustment to reduce the aggregate data rate.

Figure 13:
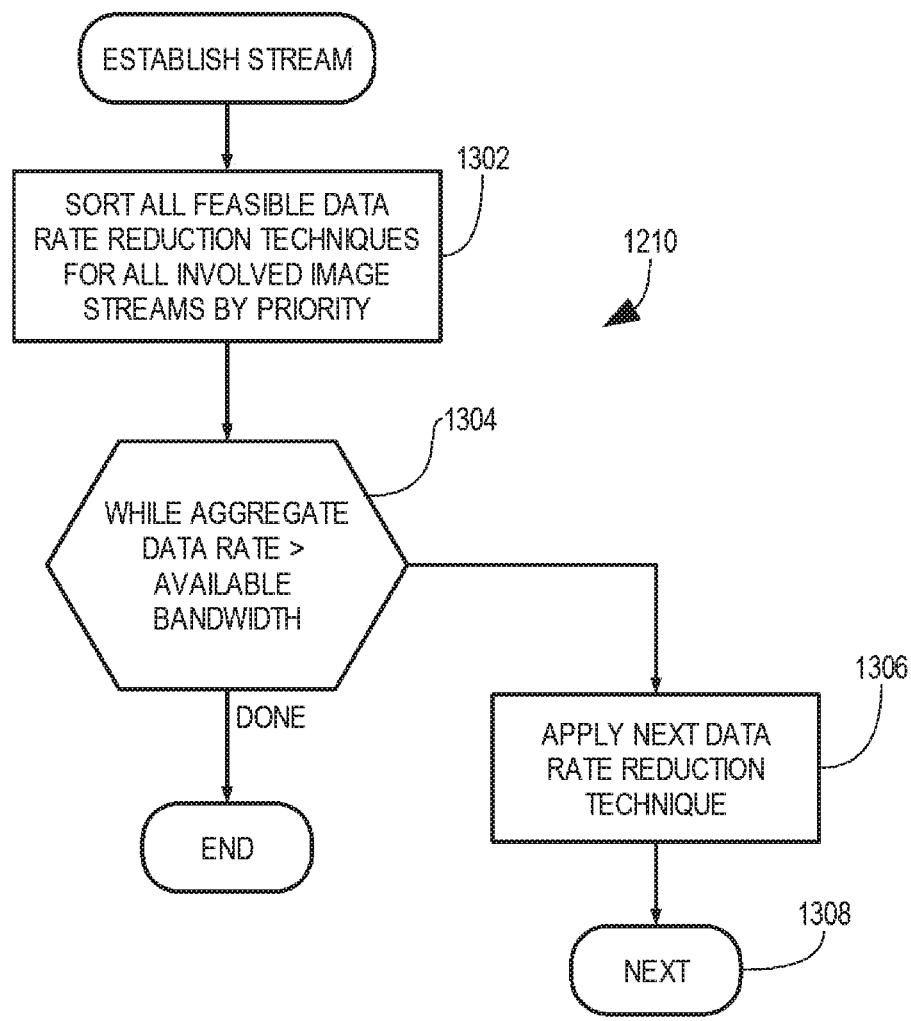
FIG. 13 is a logic flow diagram illustrating the application of data rate reduction techniques to transfer a video stream within bandwidth constraints in accordance with the present invention.

Stream manager 102 reduces the aggregate data rate so as to not exceed the available bandwidth to display node 108D in step 1210. Step 1210 is shown in greater detail as logic flow diagram 1210 (FIG. 13). In step 1302, stream manager 102 sorts all feasible data rate reduction techniques for all video streams received by display node 108D according to relative respective priorities.

The sorting of feasible data rate reduction techniques according to relative priorities can vary widely from one embodiment to another. In one embodiment, more recently started video streams are given higher priority than less recently started video streams and a default data rate reduction policy is applied to each video stream. Alternatively, relative priorities of windows in display wall 200 (FIG. 15) are based on respective depths of the windows in display wall 200 as represented by user interface 110 (FIG. 1). In a graphical user interface having windows, windows typically have an associated depth. When two windows in a graphical user interface overlap, the relative depths of the windows determines which window obscures the other. In essence, a window's depth can be considered one representation of the window's relative priority in the graphical user interface. In sorting data rate reduction techniques, stream manager 102 can give higher priority to more aggressive data rate reduction techniques to windows of greater depths, i.e., that are more likely to be obscured by another window. The default policy can specify a series of data rate reduction techniques to be applied in sequence.

In a more complex embodiment, user interface 110 and stream manager 102 cooperate to allow a user to manually specify relative priorities for each video stream and for each video stream, specify ranked preferences for application of data me reduction techniques. For example, the user can rank preservation of frame rate relatively highly if smoothness of motion is particularly important tor a given video stream or can rank preservation of image clarity if smoothness of motion is less important than image clarity in the video stream.

Data rate reduction techniques for a particular video stream are not necessarily contiguous within the sorted list of feasible data rate reduction techniques. For example, the sorted list might indicate that the first time data rate reduction techniques to apply in sequence are reduction of the frame rate of the video stream of window 204P, redundancy avoidance of the lower right portion of window 204A, and color depth reduction of window 204P.

Loop Step 1301 and next step 1308 define a loop in which stream manager 102 performs step 1306 while the aggregate data rate exceeds the available bandwidth to display node 108D. Thus, in loop step 304, stream manager 102 determines the aggregate data rate and compares the aggregate rate to the available bandwidth to display node 108D, transferring processing to step 1306 if the aggregate data rate exceeds the available bandwidth to display node 108D.

In step 1306, stream manager 102 applies the next data rate reduction technique of the sorted list constructed in step 1302. The list is sorted in ascending priority such that highest priority techniques are applied last. For example, assigning a high priority to the data rate of the video stream of window 204A causes stream manager 102 to avoid reduction of the frame rate of that video stream. Stream manager 102 applies a data rate reduction technique by recording a change in the interchange format of the particular video stream to which the data rate reduction technique pertains and estimates a new aggregate data rate based on the newly modified interchange format. The following example is illustrative.

Consider that the data rate reduction technique to be applied in a given iteration of the loop of steps 1304-1308 is the reduction of frame rate in the video stream of window 204P. Stream manager 102 has determined an interchange format in which display node 108D is to receive the video stream to display in window 204P. To apply the data rate reduction technique, stream manager 102 modifies the interchange format for the video stream of window 204P, e.g., by reducing the frame rate by 50%. Knowing the other parameters of the interchange format, stream manager 102 can estimate a data rate for the video stream of window 204P with the modified interchange format and can therefore estimate a new aggregate data rate reflecting the same change.

Processing transfers through next step 1308 to loop step 1304 in which stream manager 102 determines whether the most recently applied data rate reduction technique has sufficiently reduced the aggregate data ate to be within the available bandwidth to display node 108D. If the aggregate data rate still exceeds the available bandwidth to display node 108D, processing transfers to slop 1306 and stream manager 102 applies the next data rate reduction technique in the manner described above. It should be noted that the data rate reduction techniques applied in repeated iterations of step 1306 accumulate. In an alternative embodiment, feasible comb nations of data rate reduction techniques are listed and sorted in step 1302 and application of the combinations of data rate reduction techniques do not accumulate.

Once the aggregate data rate docs not exceed the available bandwidth to display node 108D, processing according to logic flow diagram 1210, and therefore step 1210 (FIG. 12), completes. After either step 1208 or step 1210. processing according to logic flow diagram 1200 completes. Thus, stream manager 102 applies data rate reduction techniques in order of increasing priority until all video streams can be delivered to display node 108D within the available bandwidth.

It is also possible that addition of a new video stream would exceed available bandwidth from a particular capture node, e.g., capture node 106A. Consider, for example, that the video stream to be displayed in window 204P (FIG. 15) is a reduced-size version of the video stream produced by capture node 106A, e.g., the video stream displayed in window 204A. In another example, the reduced-size version of the same video stream produced by capture node 106A can be directed to another display node which is not part of display wall 200, either within a local area network accessible through switch 104 and perhaps one or more other switches or accessible through the Internet 112.

Addition of a new video stream from capture node 106A by stream manager 102 is generally analogous to the addition of a new stream to a given display node. While a single capture node typically captures and sends only a single video signal, it may be desirable to send the video signal of the capture node to multiple destination nodes simultaneously. Capture node 106A can send the same video stream to multiple destinations using a multicast technique. However, sending full and complete video streams to multiple display nodes that display only a portion of that video signal reduces the ability of those display nodes to receive other video streams due to bandwidth limitations at the display nodes. In this illustrative example, display node 108D cannot produce the reduced-size video stream of window 204P from the full-size video stream of window 204A for two reasons. First, display node 108D receives only a portion of the video signal of window 204A for display of the lower right corner and therefore does not already receive the entire full-size video stream. Second, in this illustrative example. receipt of the respective portions of the video signals of windows 204A and 204C already use most, if not all, of the available bandwidth to display node 108D; insufficient bandwidth is available to display node 108D to receive the full-size video stream of window 204A. Thus, capture node 106A must provide the reduced-size version of the video stream in addition to the full-size portions displayed in window 204A.

In a manner analogous to that described above with respect to logic flow diagram 1210, stream manager 102 applies data rate reduction techniques to the various video streams produced by capture node 106A in order of ascending priority until the aggregate data rate of all video streams produced by capture node 106A are within the available bandwidth from capture node 106A. As described above with respect to prioritizing video streams received by display node 108D, video streams produced by capture node 106A can be prioritized in a wide variety of ways, including automated prioritization according to predetermined policies and manual prioritization by a user through user interface 110.

F. Extensibility of the Video Distribution System

FIG. 14 shows the video distribution system of FIG. 1 with some additional elements, including a data store 1402, a digital signal processor 1404, and a timer 1406.

Data store 1402 functions generally as a display trade as described above but archives video streams rather than displays them. If a video stream is to be archived, stream manager 102 causes the capture node producing the video stream, e.g., capture node 106A, to send a highly condensed version of the video stream to data store 1402. In an illustrative embodiment, stream manager 102 and user interface 110 allow a user to specify whether a particular video stream us to be archived. In another embodiment, all video streams are archived without requiring intervention by any user. In yet another embodiment, video streams from predetermined capture nodes are archived.

The highly condensed version of the video stream can be highly condensed in any of a number of ways. For example, the highly condensed version can be (i) reduced in size, e.g., in the number of scanlines and/or number of pixels per scanline; (ii) reduced in frame rate, e.g., as low as one frame per second or lower; (iii) reduced color depth; and/or (iv) aggressively compressed using lossy compression techniques. Of course, lossless compression techniques can also be used.

In receiving the highly condensed video stream, data store 1402 does not convert the video stream to any displayable interchange format in this illustrative embodiment since there is no particular interchange format preferred by data store 1402. Instead, data store 1402 merely accumulates and stores the highly condensed video stream in the interchange format selected by stream manager 102. In an alternative embodiment, data store 1402 converts the highly condensed video stream to a standard archival format such as the known MPEG-4 format, for example.

For playback of archived video streams, data store 1402 can also act as a capture node, sending the archived video stream in the interchange format in which the video stream was archived or, alternatively, convening the archived video stream from the archival format to an interchange format selected by stream manager 102 for delivery to a display node. In addition, using timestamps embedded in the video signal and in other video signals that were captured concurrently, data store 1402 can synchronize sending of multiple video signals such that the temporal relationships between the multiple video signals are preserved. Such allows recall of several cameras observing the same time space, such as, an array of security cameras focused on different subject spaces and the same time, to recreate the video signal content of multiple windows that might have been viewed, for example in display wall 200, in a given point in time.

Digital signal processor 1404 can perform such complex tasks as high-quality de-interlacing, edge detection, motion detection, and filtering such as sharpening, smoothing, and/or noise reduction on behalf of Other nodes shown in FIG. 14. For illustration purposes, it is helpful to consider the example of an interlaced video signal captured by capture node 106A and a de-interlaced video signal expected by display node 108A. Consider also that capture node 106A produces only interlaced signals and display node 108A only accepts progressive scan signals. In determining a selected interchange format, stream manager 102 determines that no interchange formats are commonly supported by both capture node 106A and display node 108A. Rather than indicating a failure to select an acceptable interchange format, stream manager 102 can request de-interlacing service from digital signal processor 1404. Thus, digital signal processor 1404 can receive a video signal in one interchange format and send the video signal in a different interchange format. In addition, digital signal processor 1404 can receive and send the video signal in the same interchange format, processing the video signal content, e.g., by applying edge detection, motion detection, and filtering such sharpening, smoothing, and/or noise reduction to the video signal itself Edge detection, motion detection, and filtering are known and are not described herein.

Digital signal processor 1404 performs such a service by acting as both (i) a display node receiving an interlaced audiovisual signal from capture node 106A and (ii) a capture node producing a de-interlaced audiovisual signal for display node 108A.

Timer 1406 is attached to a port of switch 104 and provides a system-wide clock signal.

In one embodiment, each of capture nodes 106A-C is configured to discover the presence of timer 1406 and to synchronize internal clocks with timer 1406 when timer 1406 is present. By synchronizing internal clocks of multiple capture nodes, display nodes are able to synchronize multiple audiovisual signals from multiple capture nodes by comparison of timestamps that are included in the audiovisual streams in the manner described below. In addition, timer 1406 can periodically send the timing synchronization packet at predetermined intervals known to nodes relying on the timing synchronization packet. Furthermore, in a video distribution system including multiple display walls, multiple timers like timer 1405 can each serve display nodes of a respective display wait.

Data store 1402, digital signal processor 1404, and timer 1406 illustrate the modularity of the video distribution system described herein. Additional data stores and digital signal processors can be coupled to switch 104 to provide additional storage and processing capacity and/or to provide additional types of archival and/or digital signal processing. Furthermore, data stores, digital signal processors, and timers can serve subsets of the video distribution network providing services regionally. As an illustrative example of such regional service, a separate data store, digital signal processor and or timer can serve each collection of display nodes collectively constituting a respective display wall in a video distribution having multiple such display walls.

G. Remote Monitoring

Stream manager 102 implements a remote monitoring system in this illustrative embodiment. In particular, stream manager 102 communicates with a remote client computer 114 through the Internet 112. In this illustrative embodiment, stream manager 102 receives highly condensed versions of video streams passing through switch 104 in the manner described above with respect to data store 1402 and makes those highly condensed video streams available to a remotely located computer such as client computer 114. For example, client computer 114 can receive a video stream representing a miniaturized view of the collective display of display monitors 202A-D, i.e., of display wall 200. In addition, a user interface similar to user interface 110 is provided within client computer 114 such that a remotely located user can configure a number of features of display wall 200, such as locations and sizes of respective windows displayed in display wall 200 and various priorities for various respective video streams to optimize data rate reduction technique selection by stream manager 102 in the manner described above.

In addition to, or instead of, providing a miniaturized representation of display wall 200 through Internet 112, stream manager 102 can also make highly condensed versions in individual video streams and/or the miniaturized representation of display wall 200 available to computer 114 directly through switch 104 or though a LAN rather than through Internet 112.

H. Distribution of Audio Signals

While display of video signals side-by-side seems perfectly manageable for a viewer, sound from multiple sources is not so easily juxtaposed for listening. Accordingly, any audio signal received by any of capture nodes 106A-C is treated as a separate signal for routing through switch 104 independently of any accompanying video signal received by the same capture node. Any of display monitors 202A-D can play audio associated with the video of any of windows 204A-C and still provide an integral audiovisual experience for a human viewer. For example, while window 204B is displayed entirely within display monitor 202C, display monitor 202B can play audio associated with window 204B. Since display monitors 202A-D are in close physical proximity to each other, sound produced by any of display monitors 202A-D can be perceived as produced by display wall 200. In addition, an audio-only display device 1408 (FIG. 14) can receive audio streams for playback in conjunction with video displayed by display wall 200.

Transporting an audio signal as a separate data stream from any video signal to which the audio signal corresponds raises a number of issues. These issues include correlation, synchronization, and mixing.

While audio streams are transported independently of any corresponding video streams through switch 104, it is preferred that audio streams are sufficiently linked to corresponding video streams that the audio and video signals can be synchronized for playback to a human viewer for an integrated audiovisual experience. In one embodiment, stream manager 102 assumes that each of capture nodes 106A-C captures a single signal from a single source. Thus, if a capture node produces both video and audio streams, it is presumed that the video and audio streams are captured from a single, integrated audiovisual signal. Accordingly, stream manager 102 assumes that all video streams sent by a single capture node are various representations of a single video signal and that any audio stream sent by the same capture node corresponds to that video signal. In an alternative embodiment, each capture node associates an identifier with each source device from which audiovisual signals are captured and reports that identifier to stream manager 102 for each video and/or audio stream started at the request of stream manager 102. Thus, stream manager 102 can determine whether a particular audio stream corresponds to a particular video stream by comparison of respective source identifiers. Use of source identifiers enables proper tracking by a capture node of various signals captured from multiple sources in an embodiment in which capture nodes can capture signals of multiple source devices.

It preferred that such source identifiers are unique within the video distribution system of FIG. 14. In one embodiment, each capture node generates source identifiers unique to itself and concatenates the source identifier with a unique capture node identifier to ensure that the complete source identifier is unique within the video distribution system. In an alternative embodiment, each capture node requests a new source identifier from stream manager 102 when a new source identifier is needed, and stream manager 102 ensures that all issued source identifiers are unique with respect to one another.

Since separate audio and video streams can represent a single, integrated audiovisual signal, it is preferred that the audio and video streams are synchronized during playback to a viewer. It should be noted that human perception of sounds and sights are such that playback of audio can be delayed relative to playback of corresponding video but playback of sound should not be advanced relative to playback of corresponding video. Since light travels faster than sound, people are accustomed to hearing a distant event slightly after seeing the distant event and people can properly correlate early video and late audio that correspond to one another. However, the reverse is not true; people have substantial difficulty processing an audiovisual experience in which the sound is early relative to the video. Accordingly, some leeway can be allowed with respect to delaying playback of an audio stream relative to a corresponding video signal where no leeway should be allowed with respect to delaying playback of a video stream relative to a corresponding audio signal.

As described above, capture node 106A includes frame numbers in video streams and broadcasts a synchronize packet such that all recipient display nodes, e.g., display nodes 108A-D, display various portions of the same frame at the same time. Capture node 106A also includes timestamps in the video signals and/or in the broadcast synchronize packets to identify a time at which a particular frame of the captured video signal was captured. When capturing an audio signal, capture node 106A also inserts periodic timestamps into the audio stream, using the same clock according to which timestamps are included in the video streams of capture node 106A.

To avoid allowing playback of the audio to advance before the corresponding playback of a video stream, the display node receiving the audio stream buffers the audio data and only plays back those parts of the audio signal associated with timestamps which are earlier than the timestamp of the most recently received synchronize packet. As described above, a frame synchronization packet indicates to all involved display nodes that a particular frame of a video signal is ready to be displayed. Audio data associated with timestamps equal to, or earlier than, the timestamp of the synchronize packet corresponds to the current frame or perhaps an earlier frame and is therefore not premature for playback.

As described above, multiple audio signals do not lend themselves to convenient juxtaposition. Multiple audio streams can be available through the video distribution system of FIG. 14, and simultaneous playback of those multiple audio streams by display nodes 108A-D and/or 1408 can result in a cacophony of discordant sounds. Accordingly, stream manager 102 allows a user, through user interface 110, to control the volume of each of a multitude of audio streams individually, much like an audio mixer. In one embodiment, each of windows 204A-D (FIG 15) includes a graphical user interface object, such as a slider bar or twist knob, by which the user can control the volume at which an associated audio signal is played back. In an alternative embodiment, user interface 110 includes a virtual mixer display, e.g., within its own window within display wall 200, in which textual identifiers of each audio stream are associated with a slider volume control graphical user interface object. It is preferred that both embodiments include mute controls for each audio stream such that the user can easily mute individual audio signals.

In response to a user command through user interface 110 to change the volume at which a particular audio stream is played back, stream manager 102 identifies the particular display device playing back the particular audio stream and issues a command to the display device to play the audio stream back at a specified volume. Thus, through display device 1408 and/or through the respective audio playback circuitry of display monitors 202A-D, a single, integrated, and user controlled audio mix of one or more audio streams from capture nodes 106A-C can be played, all managed by stream manager 102.

The above description is illustrative only and is not limiting. Instead, the present invention is defined solely by the claims which follow and their full range of equivalents.

The invention claimed is:

1. A method, comprising:
 prior to sending a video stream from a capture node to a display node,
  selecting an interchange format of the video stream via a stream manager that is separate from a capture node and a display node,
  sending destination control information from a stream manager to the display node,
  sending instructions to the display node from the stream manager that instruct the display node to expect the video stream from the capture node, and
  instructing the capture node to send the video stream in the selected interchange format to the display node via the stream manager, wherein the stream manager selects the interchange format based on a proportion of bandwidth available between the capture node and the display node displaying the video stream; then
 sending the video stream from the capture node to the display node in the selected interchange format without the stream manager receiving the video stream; and
 at the display node,
  receiving the destination control information as part of a data stream from the stream manager through a network, the data stream comprising one or more data packets;
  receiving the instructions that identify the capture node and instruct the display node to process the video stream when the display node receives the video stream from the capture node; and then
  receiving and accepting a video stream delivered from a capture node through the network in a same interchange format as the video stream was sent from the capture node responsive to receiving the destination control information, where the stream manager selects the interchange format of the video stream and instructs the capture node to format and deliver the video stream to the display node in the selected interchange format prior to the video stream being delivered to the display node, and where the stream manager is separate from the capture node; and then
  displaying the video stream via the display node, wherein displaying the video stream includes displaying the video stream on an integrate d tiled display.

2. The method of claim 1, wherein the interchange format is selected based on a proportion of bandwidth available between the capture node and the display node displaying the video stream.

3. The method of claim 2, further comprising authorizing the capture node to transmit the data stream for a predetermined duration based on the proportion of bandwidth available.

4. The method of claim 1, wherein the integrated tiled display comprises multiple display monitors that form a display wall.

5. The method of claim 1, wherein the destination control information received is multicast addressed destination control information, and wherein displaying the video stream includes displaying a same video stream on multiple devices simultaneously.

6. The method of claim 1, wherein displaying the video stream includes displaying different portions of the video stream via multiple display monitors.

7. A method, comprising:
 prior to sending a video stream from a capture node to a display node,
  selecting an interchange format of the video stream via a stream manager that is separate from the capture node and the display node,
  sending destination control information to the display node from the stream manager,
  sending instructions to the display node from the stream manager that instruct the display node to expect the video stream from the capture node, and
  instructing the capture node to send the video stream in the selected interchange format to the display node via the stream manager, wherein the stream manager selects the interchange format based on a proportion of bandwidth available between the capture node and the display node displaying the video stream; then
 sending the video stream from the capture node to the display node in the selected interchange format without the stream manager receiving the video stream;
 at the display node,
  receiving the destination control information as part of a data stream from the stream manager that is separate from the capture node,
  receiving the instructions that identify the capture node and instruct the display node to process the video stream when the display node receives the video stream from the capture node; and then
  receiving the video stream through a network from the capture node in the interchange format selected by the stream manager, wherein the capture node formats and delivers the video stream in the interchange format selected by the stream manager; and
 displaying the video stream, wherein displaying the video stream includes displaying the video stream on an integrate d tiled display.

8. The method of claim 7, wherein the display node is one display node of a plurality of display nodes, and wherein the video stream displayed is a same video stream at each of the plurality of display nodes.

9. The method of claim 8, wherein the same video stream is displayed simultaneously on each of the plurality of display nodes.

10. The method of claim 7, wherein the interchange format specifies a digital format for the video stream.

11. The method of claim 7, further comprising:
sending capabilities data from the display node to the stream manager, the capabilities data representing one or more video signal processing capabilities of the display node.

12. The method of claim 11, wherein the interchange format selected by the stream manager is based on the capabilities data.

13. The method of claim 7, further comprising:
in the display node, receiving a frame synchronization packet, wherein the frame synchronization packet indicates that a complete frame of the video stream has been received from the capture node.

14. The method of claim 7, wherein the interchange format is selected based on a proportion of bandwidth available to the display node.

15. A display node for use in a video distribution system for receiving a video stream from a capture node through a network, the display node comprising:
a processor in communication with a memory that, when executed by the processor, provides:
network control logic that is configured to receive destination control information as part of a data stream from a stream manager at the display node prior to receiving the video stream, and that is configured to receive instructions at the display node from the stream manager that instruct the display node to expect the video stream from the capture node, wherein the data stream comprises one or more data packets, wherein the stream manager is separate from the capture node and the display node, wherein the destination control information specifies an interchange format and an available bandwidth between the capture node and the display node, and wherein the instructions identify the capture node and instruct the display node to process the video stream when the display node receives the video stream from the capture node;
stream receiving logic that is configured to receive the video stream sent from the capture node to the display node through a switch of the network in the interchange format that is a same interchange format as the video stream was sent from the capture node after receiving the destination control information and after receiving the instructions, where the stream manager selects the interchange format based on the available bandwidth between the capture node and the display node, and where the stream manager instructs the capture node to deliver the video stream to the display node in the selected interchange format, the video stream sent from the capture node to the display node in the selected interchange format without the stream manager receiving the video stream, and wherein the capture node formats and delivers the video stream in the interchange format selected by the stream manager; and
display driving logic for displaying the video stream via a plurality of display devices, wherein displaying the video stream includes displaying the video stream on an integrated tiled display.

16. The display node of claim 15, wherein the destination control information specifies a digital format for the video stream.

17. The display node of claim 15, wherein the destination control information received is multicast addressed destination control information.

18. The display node of claim 17, wherein displaying the video stream via the plurality of display devices includes displaying a same video stream simultaneously via the plurality of display devices.

* * * * *